US 12,468,019 B2

(12) United States Patent
Sakimura et al.

(10) Patent No.: US 12,468,019 B2
(45) Date of Patent: Nov. 11, 2025

(54) LIGHT RECEIVING DEVICE AND LIGHT RECEIVING CIRCUIT

(71) Applicant: SONY SEMICONDUCTOR SOLUTIONS CORPORATION, Kanagawa (JP)

(72) Inventors: Noboru Sakimura, Kanagawa (JP); Fumihiko Hanzawa, Kanagawa (JP); Yasunori Tsukuda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 529 days.

(21) Appl. No.: 17/781,243

(22) PCT Filed: Oct. 26, 2020

(86) PCT No.: PCT/JP2020/040045
§ 371 (c)(1),
(2) Date: May 31, 2022

(87) PCT Pub. No.: WO2021/117359
PCT Pub. Date: Jun. 17, 2021

(65) Prior Publication Data
US 2022/0413108 A1 Dec. 29, 2022

(30) Foreign Application Priority Data
Dec. 10, 2019 (JP) ................. 2019-222936

(51) Int. Cl.
*G01S 7/4863* (2020.01)
*G01S 7/4865* (2020.01)

(52) U.S. Cl.
CPC ........... *G01S 7/4863* (2013.01); *G01S 7/4865* (2013.01)

(58) Field of Classification Search
CPC ............................ G01S 7/4863; G01S 7/4865
See application file for complete search history.

(56) References Cited

U.S. PATENT DOCUMENTS

2006/0202129 A1    9/2006   Niclass et al.
2013/0015323 A1    1/2013   Sayuk et al.
(Continued)

FOREIGN PATENT DOCUMENTS

CN    105008962 A    10/2015
CN    109239694 A     1/2019
(Continued)

OTHER PUBLICATIONS

International Search Report and Written Opinion of PCT Application No. PCT/JP2020/040045, issued on Dec. 28, 2020, 15 pages of ISRWO.

*Primary Examiner* — Thanh Luu
(74) *Attorney, Agent, or Firm* — CHIP LAW GROUP

(57) ABSTRACT

[Object]
Provided are a light receiving device and a light receiving circuit that are capable of performing highly accurate ranging with an increased field of view (FOV).
[Solving Means]
A light receiving device according to the present disclosure includes a light detector array including a plurality of pixels each configured to output a pulse in response to a reaction of a light detector with a photon, a counter circuit configured to count the pulse outputted from at least one of the pixels of the light detector array, and a control circuit configured to select, from the light detector array, one of the pixels to be enabled and one of the pixels to be disabled, on the basis of the number of counts of the pulse from the counter circuit.

8 Claims, 27 Drawing Sheets

(56) References Cited

U.S. PATENT DOCUMENTS

| | | |
|---|---|---|
| 2016/0011321 A1 | 1/2016 | Solf |
| 2018/0308881 A1 | 10/2018 | Hynecek |
| 2019/0018117 A1 | 1/2019 | Perenzoni et al. |
| 2020/0057150 A1* | 2/2020 | Beer ........................ G01S 17/10 |

FOREIGN PATENT DOCUMENTS

| | | |
|---|---|---|
| CN | 110249624 A | 9/2019 |
| CN | 110308451 A | 10/2019 |
| DE | 10100160 A1 | 7/2001 |
| DE | 102018213819 B3 | 11/2019 |
| EP | 2965120 A1 | 1/2016 |
| EP | 3428683 A1 | 1/2019 |
| JP | 2013-046232 A | 3/2013 |
| JP | 2014-077658 A | 5/2014 |
| JP | 2016-513788 A | 5/2016 |
| JP | 2019-032305 A | 2/2019 |
| RU | 2015142655 A | 4/2017 |
| WO | 2013/009428 A2 | 1/2013 |
| WO | 2014/135465 A1 | 9/2014 |

\* cited by examiner

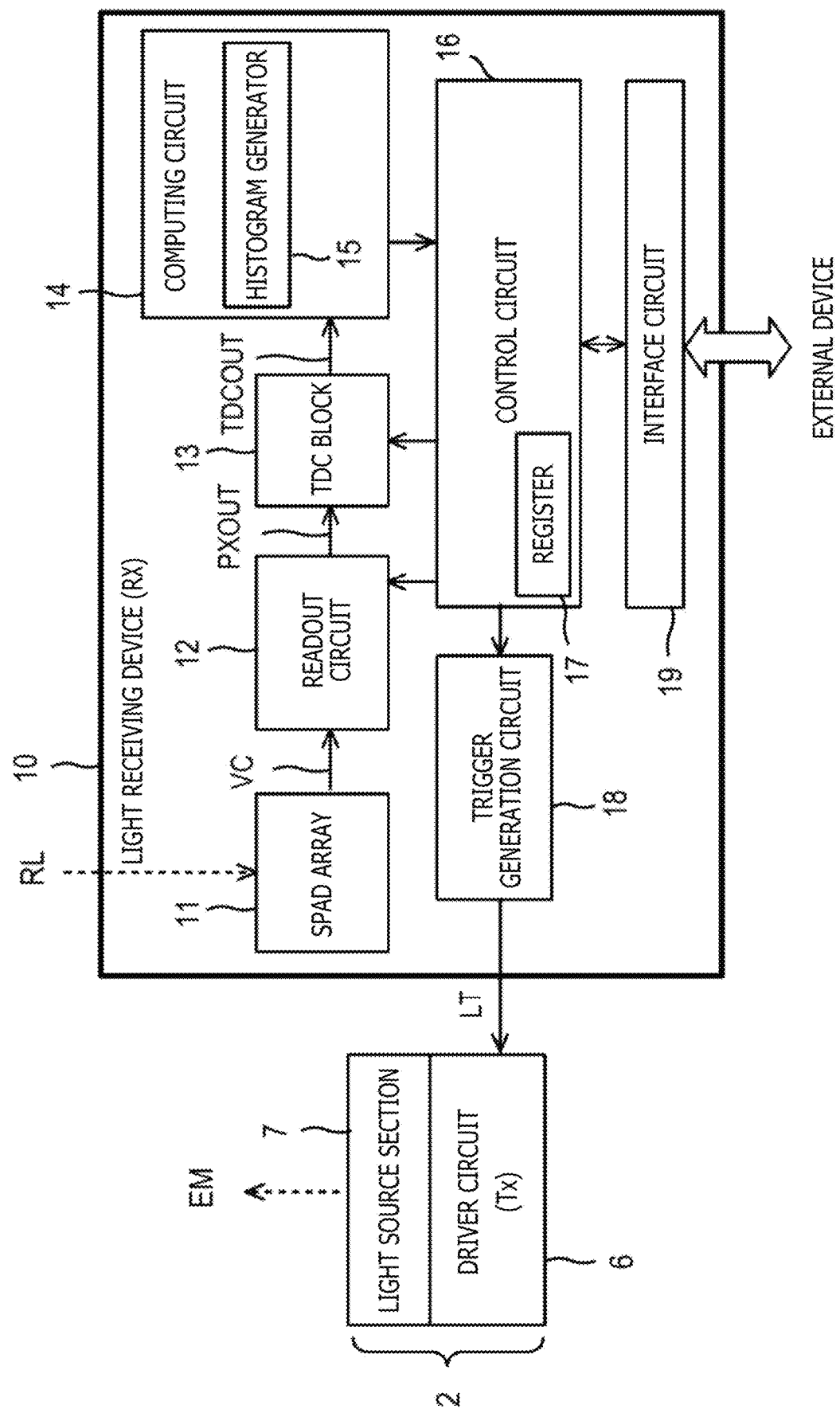
F I G . 2

FIG.3
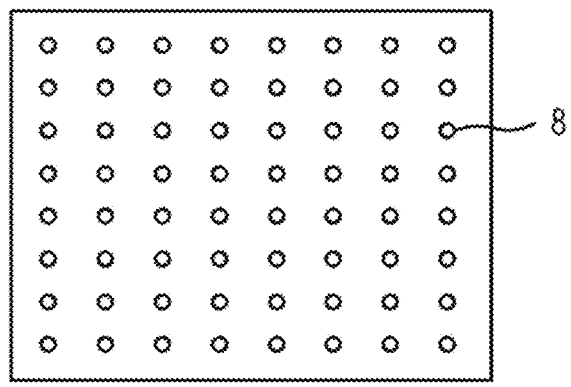

ENLARGED VIEW AT POSITION L1

ENLARGED VIEW AT POSITION L2

Maximum Distance [m]

Spot Diameter Φ [μm]

| Px A | Px B | R1 NO OR | R2 OR |
|---|---|---|---|
| 0 | 0 | $(1-p)^2$ | $(1-p)^2$ |
| 0 | 1 | $p(1-p)$ | $p(1-p)$ |
| 1 | 0 | $p(1-p)$ | $p(1-p)$ |
| 1 | 1 | $2*p^2$ | $p^2$ |
| TOTAL | | $2p$ | $2p-p^2$ |

EXPECTED VALUES OF PHOTON DETECTION PROBABILITY

RELATIONSHIP BETWEEN EXPECTED VALUE OF
PHOTON DETECTION COUNT AND DISTANCE

SETTING EXAMPLE OF MACROPIXEL

SETTING EXAMPLE OF MACROPIXEL

25

| PIXEL STATUS | PXSEL | SPAD VOLTAGE | OUTPUT |
|---|---|---|---|
| SELECTED | HIGH | VBD+Ve (QUENCHABLE) | ENABLED |
| NOT SELECTED | LOW | VBD (NOT QUENCHABLE) | DISABLED |

EXAMPLE OF OPERATION CONDITIONS FOR LIGHT RECEIVING CIRCUIT 20

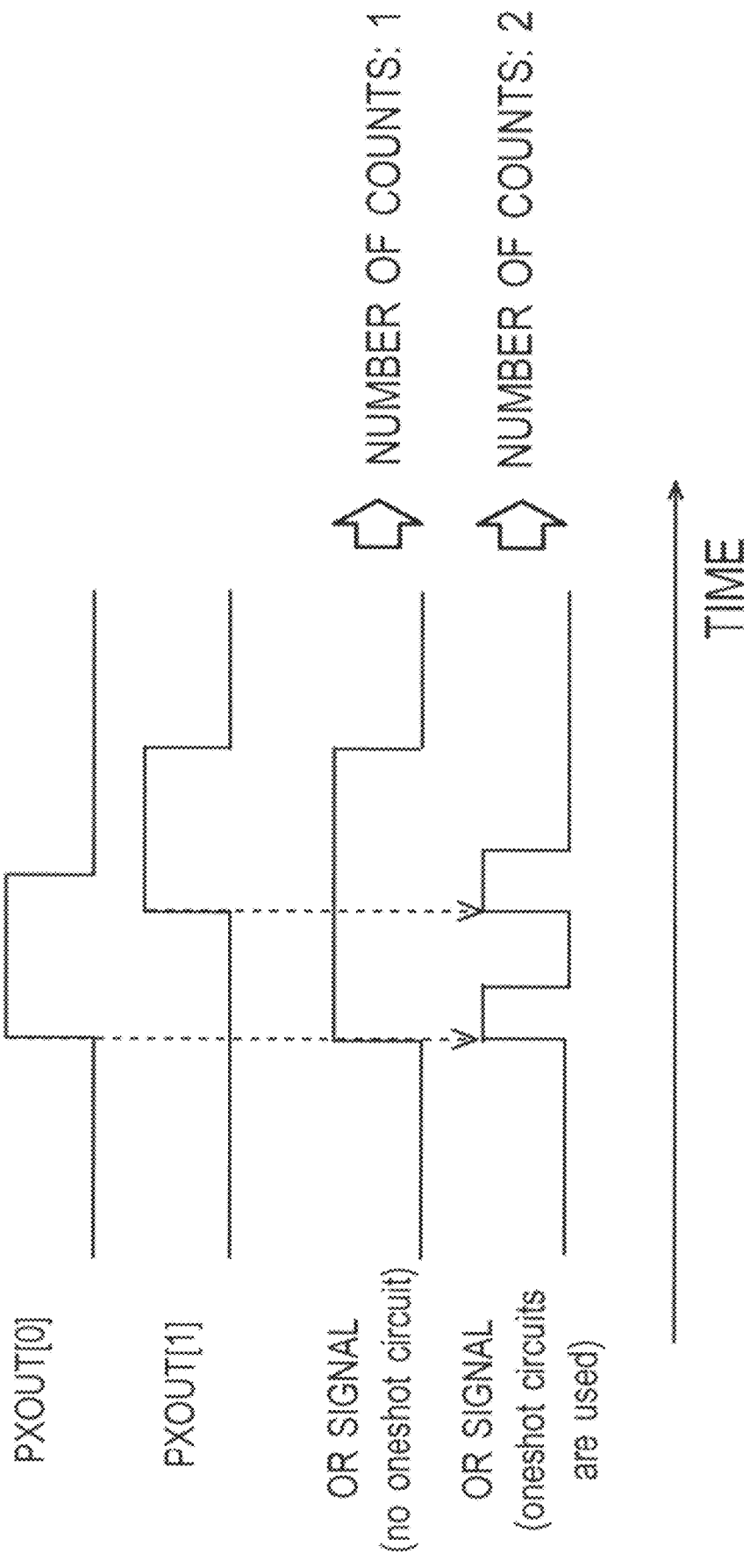

20A: LIGHT RECEIVING CIRCUIT

FIG.26

EXAMPLE OF NUMBER OF COUNTS OF PHOTONS

| Vertical Address \ Horizontal Address | 0 | 1 | 2 | 3 | 4 | 5 | 6 | 7 |
|---|---|---|---|---|---|---|---|---|
| 0 | 18 | 29 | 12 | 34 | 15 | 23 | 32 | 19 |
| 1 | 27 | 22 | 36 | 42 | 39 | 26 | 27 | 34 |
| 2 | 18 | 44 | 102 | 563 | 497 | 246 | 51 | 36 |
| 3 | 21 | 30 | 431 | 842 | 901 | 599 | 101 | 53 |
| 4 | 11 | 45 | 459 | 758 | 1137 | 750 | 159 | 47 |
| 5 | 26 | 39 | 259 | 678 | 961 | 823 | 96 | 28 |
| 6 | 35 | 48 | 80 | 373 | 399 | 207 | 36 | 23 |
| 7 | 29 | 34 | 55 | 85 | 100 | 63 | 21 | 18 |

LIGHT RECEIVING DEVICE AND LIGHT RECEIVING CIRCUIT

CROSS REFERENCE TO RELATED APPLICATIONS

This application is a U.S. National Phase of International Patent Application No. PCT/JP2020/040045 filed on Oct. 26, 2020, which claims priority benefit of Japanese Patent Application No. JP 2019-222936 filed in the Japan Patent Office on Dec. 10, 2019. Each of the above-referenced applications is hereby incorporated herein by reference in its entirety.

TECHNICAL FIELD

The present disclosure relates to a light receiving device and a light receiving circuit.

BACKGROUND ART

In a plurality of fields of vehicle installation, mobiles, FA, etc., a technology of measuring a distance to an object on the basis of a time of flight (ToF), which is taken by light outputted from a light source to return to a light detector after reflected on the object, has been increasingly applied. These applications require ranging a subject at a further distance with an increased field of view (FOV) where ranging is possible. For example, arrayed single photon avalanche diodes (a SPAD array) are used to detect reflected light.

CITATION LIST

Patent Literature

[PTL 1]
Japanese Patent Laid-Open No. 2019-32305

SUMMARY

Technical Problems

To obtain an increased field of view, a light source (Tx) includes a wide-angle collimator lens. However, a deterioration in off-axis properties attributed to aberration (for example, coma aberration) occurs. It is usually difficult to completely correct an off-axis aberration of a lens. In contrast, a light detector (Rx) includes a condenser lens with a short focal distance and a small F value in order to ensure a field of view and an amount of light. The condenser lens with a short focal length has an enhanced perspective. This causes a spot diameter of light to be increased with an increase in distance from the center of the field of view.

Therefore, in ensuring a large field of view, an imaging performance in the vicinity of a periphery of the field of view deteriorates. In particular, in the vicinity of a periphery of a SPAD array, a ranging accuracy and a maximum ranging distance are reduced due to a decrease in the amount of incident light as compared with that in a central portion of the SPAD array.

Accordingly, the present disclosure provides a light receiving device and a light receiving circuit that are capable of performing highly accurate ranging with an increased field of view (FOV).

Solution to Problems

A light receiving device according to an aspect of the present disclosure may include a light detector array including a plurality of pixels each configured to output a pulse in response to a reaction of a light detector with a photon, a counter circuit configured to count the pulse outputted from at least one of the pixels of the light detector array, and a control circuit configured to select, from the light detector array, one of the pixels to be enabled and one of the pixels to be disabled, on the basis of the number of counts of the pulse from the counter circuit.

The control circuit may be configured to enable, within the light detector array, one of the pixels where the number of counts of the pulse exceeds a threshold and disable one of the pixels where the number of counts of the pulse is equal to or smaller than the threshold.

The light receiving device may further include a TDC, in which a plurality of the pixels may be connected to each other through a common lead and coupled to the TDC via a wired OR.

A plurality of the pixels that are not adjacent to each other within the light detector array may be connected through the common lead.

The TDC may be coupled to a plurality of the pixels in an even-numbered column or the pixels in an odd-numbered column.

A plurality of the leads may be coupled to the TDC via an OR gate.

The light receiving device may further include a oneshot circuit coupled at least either between the pixels or between an input terminal of the OR gate and the pixels.

The oneshot circuit may include an AND gate and an inverter chain coupled to one of input terminals of the AND gate.

The light detector of the light detector array may include an avalanche photodiode.

The avalanche photodiode may be configured to operate in the Geiger mode, and the pixels in the light detector array may each include a quenching circuit.

A light receiving circuit according to an aspect of the present disclosure may include a light detector, a load element coupled between the light detector and a first reference potential, a latch circuit configured to output a first voltage corresponding to a status, and a first inverter configured to be turned on in response to a second voltage applied to a control terminal and to invert and output an output voltage of the light detector, in which the second voltage to be applied to the control terminal may be variable according to the first voltage.

The light receiving circuit may further include an AND gate having a first input terminal coupled to an output side of the latch circuit, a second input terminal coupled to an enable line, and an output terminal coupled to the control terminal of the first inverter.

The light receiving circuit may further include a NAND gate having a first input terminal coupled to an output side of the latch circuit and a second input terminal coupled to an enable line, and a second inverter coupled between the NAND gate and the control terminal.

The light receiving circuit may further include a NAND gate having a first input terminal coupled to an output side of the latch circuit and a second input terminal coupled to an enable line, a first transistor of a first conductivity type, the first transistor being coupled between the first reference potential and the load element and being turned on in response to an output voltage of the NAND gate, a second transistor of a second conductivity type, the second transistor being coupled between an output side of the light detector and a second reference potential and being turned on in response to the output voltage of the NAND gate, and a second inverter coupled between an output terminal of the NAND gate and the control terminal of the first inverter.

The light detector may include an avalanche photodiode.

A light receiving device according to an aspect of the present disclosure may include a light detector array where a plurality of the light receiving circuits are arranged, and a control circuit configured to change the status of the latch circuit of at least one of the light receiving circuits within the light detector array.

The light receiving device may further include a counter circuit configured to count the number of pulses outputted from at least one of the light receiving circuits within the light detector array, in which the control circuit may be configured to change the status of the latch circuit on the basis of the number of pulses.

The control circuit may be configured to set the latch circuit of one of the light receiving circuits where the counted number of pulses exceeds a threshold in a selected status and set the latch circuit of one of the light receiving circuits where the counted number of pulses is equal to or smaller than the threshold in a non-selected status.

The light receiving device may further include a TDC, in which a plurality of the light receiving circuits may be connected through a common lead and coupled to the TDC via a wired OR.

A plurality of the light receiving circuits that are not adjacent to each other within the light detector array may be connected through the common lead.

BRIEF DESCRIPTION OF DRAWINGS

FIG. 2 is a block diagram illustrating an example of a light source device and a light receiving device.

FIG. 3 is a plan view illustrating an arrangement example of light emitting elements of the light source device.

DESCRIPTION OF EMBODIMENTS

A detailed description will be made below on preferred embodiments of the present disclosure with reference to the attached drawings. It should be noted that components having substantially the same functional configuration are referred to with the same reference sign and a redundant description thereof is omitted, accordingly.

Figure 1:
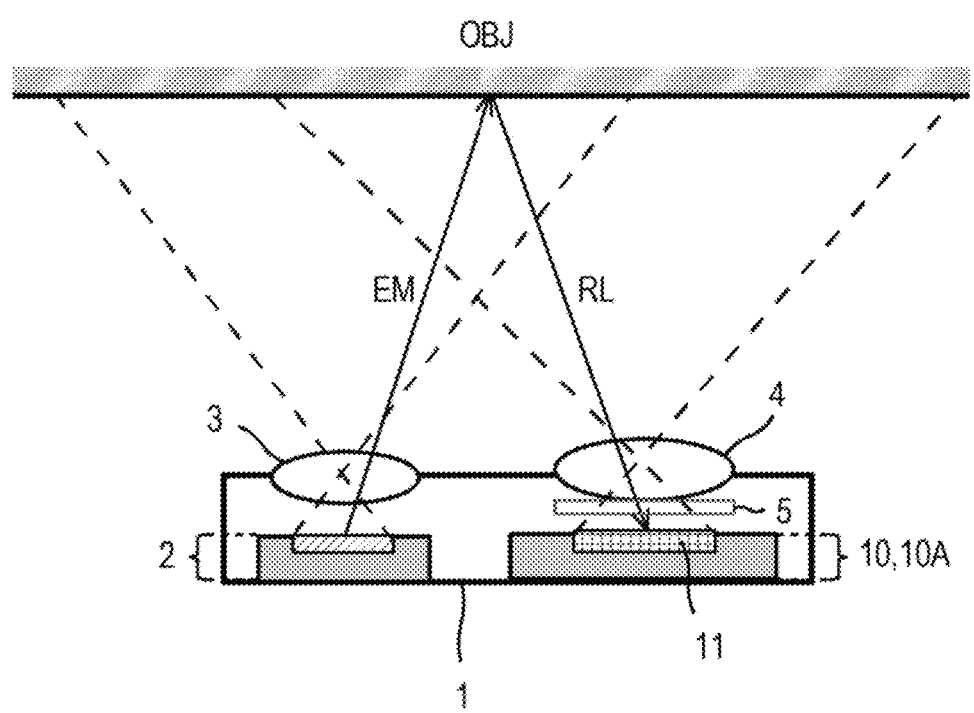
FIG. 1 is a diagram schematically illustrating an example of a ranging device according to the present disclosure.

FIG. 1 is a diagram schematically illustrating an example of a ranging device according to the present disclosure. A ranging device 1 in FIG. 1 includes a light source device 2, a collimator lens 3, a condenser lens 4, a bandpass filter 5, and a light receiving device 10. The light receiving device 10 includes a SPAD array 11. The SPAD array 11 is an example of a light detector array. In addition, the light source device 2 includes, for example, a light emitting element such as a vertical cavity surface emitting laser (VCSEL) and a driver circuit for the light emitting element.

The light source device 2 outputs light EM toward a subject OBJ. The collimator lens 3 causes the light EM to be a parallel beam. The light EM is partly reflected by the subject OBJ to be reflected light RL, being incident on the light receiving device 10. The condenser lens 4 condenses the reflected light RL onto a surface of the SPAD array 11. The bandpass filter 5 selectively causes light corresponding to a wavelength band outputted from the light source device 2 to pass through. It should be noted that a condenser lens integrated with a function of a bandpass filter may be used. Alternatively, the bandpass filter of the light receiving device may be omitted.

The ranging device 1 measures, for example, a time difference between time t0 when a trigger signal for light emission is inputted to the light source device 2 and time t1 when SPADs of the SPAD array 11 react. Then, the ranging device 1 can calculate a distance between the ranging device 1 and the subject OBJ on the basis of the time difference. For example, the distance between the ranging device 1 and the subject OBJ can be calculated by an expression $L=c/2(t1-t0)$, where c is a light speed. This method is usually referred to as time of flight (ToF) ranging.

A block diagram of FIG. 2 illustrates an example of the light source device 2 and the light receiving device 10. The light source device 2 in FIG. 2 includes a driver circuit 6 and a light source section 7. A plan view of FIG. 3 illustrates an example of the light source section. For example, an array light source 7A including a plurality of arrayed light emitting elements 8 is usable as the light source section 7. For example, the array light source 7A can be formed by arranging the plurality of light emitting elements 8 in a grid, such as a rectangular grid, a parallelotope grid, or a triangular grid, substantially in the same plane. The following description is made by taking a case where the array light source 7A in FIG. 2 is used as the light source section 7 as an example. However, the arrangement of the light emitting elements 8 of the array light source 7A and the number of the light emitting elements 8 are not specified.

It should be noted that a light source 7B (FIG. 3) including a plurality of linearly arranged light emitting elements 8 may be used as the light source section 7. For example, VCSELs are usable as the light emitting elements 8. However, the type of the light emitting elements 8 is not limited. For example, edge emitting semiconductor lasers may be used as the light emitting elements 8. It should be noted that the configuration of the light source section illustrated in FIG. 3 is merely by way of example. For example, an LED light source, an organic EL light source, or the like that emits light all over the entire surface thereof may be used as the light source section.

The light receiving device 10 in FIG. 2 includes the SPAD array 11, a readout circuit 12, a TDC block 13, a computing circuit 14, a control circuit 16, a trigger generation circuit 18, and an interface circuit 19. The computing circuit 14 includes a histogram generator 15 as an inner component. In addition, the control circuit 16 includes a register 17 as an inner component.

The SPAD array 11 includes a plurality of SPADs arranged substantially in the same plane. For example, the plurality of SPADs can be arranged in a grid such as a rectangular grid, a parallelotope grid, or a triangular grid. Here, description is made by taking a case where a SPAD array including a plurality of SPADs arranged in a square grid is used as an example. However, the arrangement of the SPADs of the SPAD array is not limited.

The readout circuit 12 outputs a pulse to a circuit downstream thereof in response to the SPADs within the SPAD array 11 reacting with a photon. For example, the readout circuit 12 may include at least any one of a quenching circuit that stops an avalanche phenomenon of the SPADs or a recharge circuit that resets a voltage level. For example, the readout circuit 12 is mounted for each of the SPADs within the SPAD array 11. In this case, pixels within the SPAD array 11 each include the SPAD and the readout circuit 12 corresponding to that SPAD. Description will be made here with the assumption that the SPAD array 11 includes substantially square pixels in a plan view. However, the shape of the pixels in the SPAD array 11 may be different from the above.

Description will be made below by taking a case where a SPAD (Single Photon Avalanche Diode) is used as a light detector as an example. However, a different type of light detector from this may be used. For example, any other type of photodiode, phototube, or the like may be used as a light detector.

The TDC block 13 is a circuit block including a plurality of TDCs (Time to Digital Converters). For example, the TDCs within the TDC block 13 are each coupled to at least one of the pixels within the SPAD array 11. The TDCs each measure, for example, a time difference between the time t1 of the pulse outputted from the readout circuit 12 (the pixel) and the time t0 when the trigger generation circuit 18 outputs a trigger signal LT to the driver circuit 6.

The computing circuit 14 performs, for example, a variety of computing processes on the basis of a signal inputted from the TDC block 13. For example, in a case where the light receiving device 10 performs ranging, the computing circuit 14 may calculate a distance between the subject OBJ and the light receiving device 10. However, an external device may perform the calculation of the distance between the subject OBJ and the light receiving device 10. For example, a hardware circuit such as a microprocessor, an ASIC, or an FPGA is usable as the computing circuit 14. It should be noted that the computing circuit 14 may include a combination of a hardware circuit and a program that is to be run on the hardware circuit.

The histogram generator 15, for example, accumulates results of the time of flight measured for a plurality of times by the TDCs within the TDC block 13 and generates a histogram. By virtue of the time of flight being measured for a plurality of times, it is possible to distinguish between a background light (a disturbance light) and the reflected light RL of the light outputted from the light source section 7. It should be noted that the histogram generator 15 may average the time of flight measured for a plurality of times to generate a histogram. As long as a peak of the histogram is obtained, a distance from the ranging device 1 to the subject OBJ can be calculated by the above expression $L=c/2(t1-t0)$. It should be noted that, in a case where the histogram generation process is to be performed by an external device, the histogram generator may be omitted.

The control circuit 16, for example, enables/disables the pixels of the SPAD array 11. For example, the control circuit 16 can set a macropixel by enabling a plurality of adjacent ones of the pixels within the SPAD array 11. The pixels (a macropixel) that are to be enabled can be determined according to a position and a range of a spotlight incident on the SPAD array 11 as described later. Spotlights on the SPAD array 11 correspond one-to-one to rays of the reflected light RL of the light outputted from the light emitting elements 8 of the light source section 7. For example, the computing circuit 14 can calculate a distance to each ranging point within a distance image on the basis of signals outputted from the pixels within the macropixel.

In addition, the control circuit 16 controls the trigger generation circuit 18 to cause the light EM to be outputted toward the subject OBJ at a predetermined timing. The trigger generation circuit 18 supplies, in response to receiving a control signal from the control circuit 16, the trigger signal LT to the driver circuit 6 of the light source device 2. The driver circuit 6 then causes the light emitting elements 8 of the light source section 7 to operate on the basis of the trigger signal LT.

It should be noted that the control circuit 16 may include the register 17. Operation conditions for the pixels within the SPAD array 11 may be able to be set using the register 17. Examples of the operation conditions for the pixels include a bias voltage of a photodiode, a sampling frequency within the SPAD array 11, a recharge current, a delay in generating a pulse for quenching, and a delay in generating a pulse for recharge. In addition, a light-emission timing or light-emission conditions for the light source device 2 may be able to be set by the register 17.

A hardware circuit such as a microprocessor, an ASIC, or an FPGA is usable as the control circuit 16. Alternatively, the control circuit 16 may include a combination of a hardware circuit and a program that is to be run on the hardware circuit. The control circuit 16 and the above-described computing circuit 14 may be provided by a common circuit or separate circuits.

The interface circuit 19 realizes data communication of the light receiving device 10 with an external device. For example, the control circuit 16 may receive a control signal from the external device via the interface circuit 19. In addition, the computing circuit 14 may transfer measured data to the external device via the interface circuit 19. It should be noted that types of communication standard and communication protocol applied to the interface circuit 19 are not specified.

Figure 4:
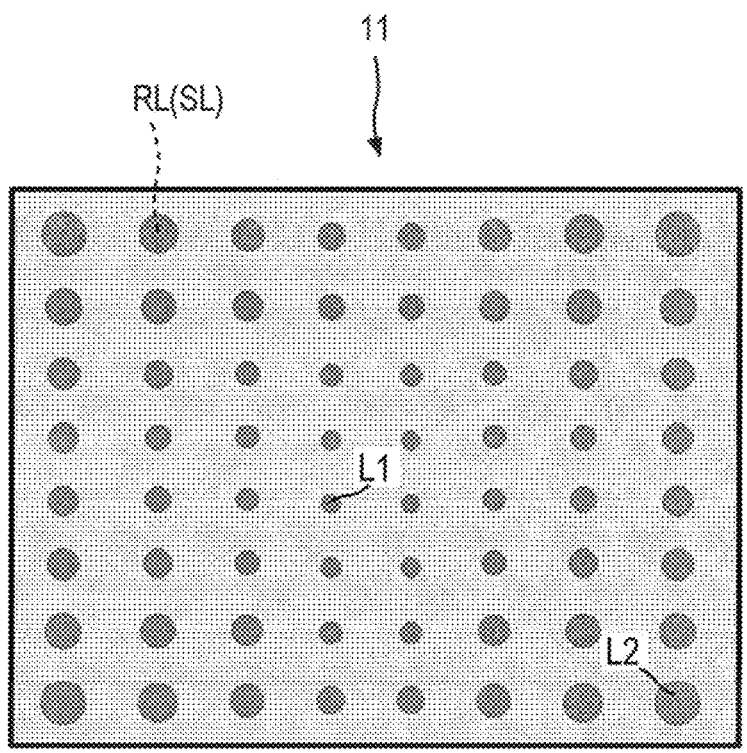
FIG. 4 is a plan view illustrating an example of a pattern of light incident on a SPAD array.

A plan view of FIG. 4 illustrates an example of a pattern of light incident on the SPAD array 11. To increase the field of view (FOV) where a photon is detectable, a wide-angle collimator lens is located on a light-source side (Tx) and a condenser lens with a short focal distance and a small F value is located on a light-detector (Rx) side in some cases. However, off-axis properties of a lens system deteriorate, which causes a spotlight SL corresponding to the reflected light RL incident on the SPAD array 11 to deform.

For example, in comparison between a spotlight at a position L1 in the vicinity of a middle of the SPAD array 11 and a spotlight at a position L2 in the vicinity of a periphery of the SPAD array 11 in FIG. 4, the latter has a larger spot diameter due to a deterioration in imaging performance. Thus, assuming that the plurality of light emitting elements 8 of the array light source 7A are substantially equal in the amount of outputted light, the amount of light incident on each of the pixels decreases with an increase in the distance from the middle of the SPAD array 11.

With the numbers of pixels contained in macropixels being set equal irrespective of positions within the SPAD array 11, the amount of light incident on the macropixel at the position L2 is small as compared with that of the macropixel at the position L1. For this reason, in a case where a distance image is generated using the SPAD array 11, a ranging accuracy and a maximum ranging distance (a ranging performance) are reduced at a ranging point in the vicinity of the periphery of the field of view.

Figure 5:
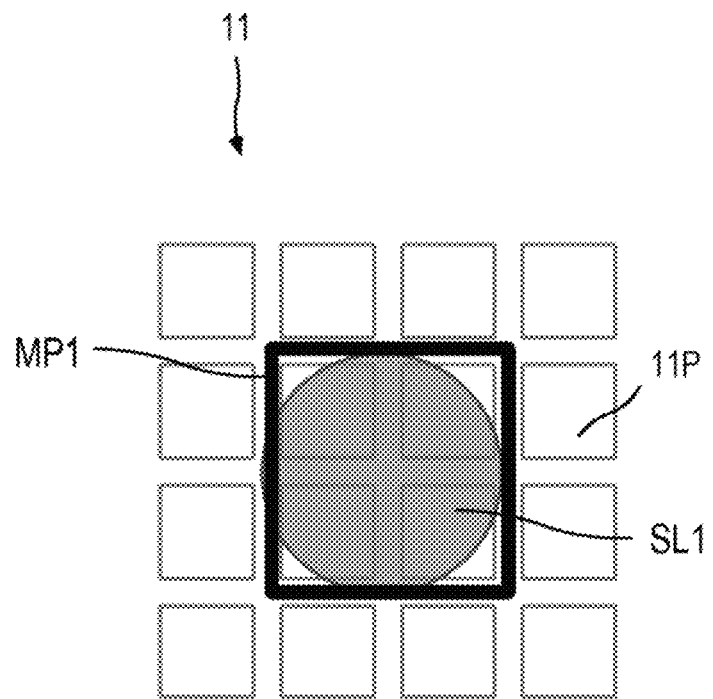
FIG. 5 is a plan view illustrating an example of a spot diameter of light and a micropixel.
Figure 6:
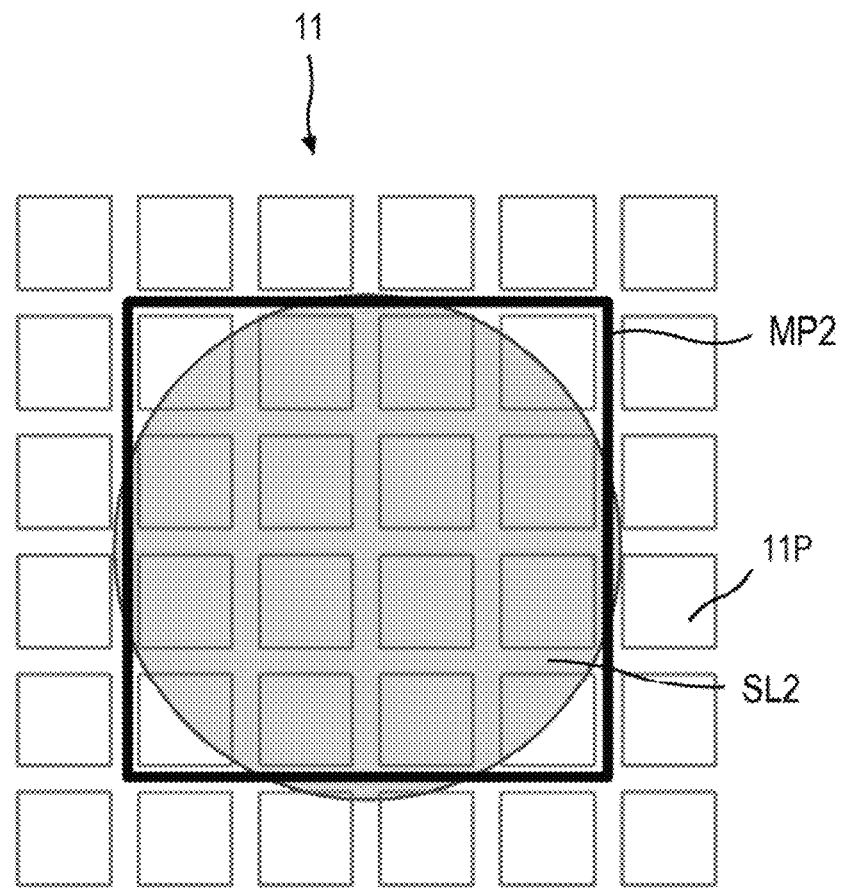
FIG. 6 is a plan view illustrating an example of the spot diameter of light and the micropixel.

Plan views of FIG. 5 and FIG. 6 illustrate examples of a position relationship between a spotlight and a plurality of pixels 11P within the SPAD array 11. FIG. 5 is an enlarged view illustrating a part where a spotlight SL1 is incident within the SPAD array 11. Meanwhile, FIG. 6 is an enlarged view illustrating a part where a spotlight SL2 is incident within the SPAD array 11. A reduction in imaging performance causes the spotlight SL2 to be larger than the spotlight SL1.

The control circuit 16 can adjust at least any one of the position, size, and shape of a macropixel by enabling freely selected one of the pixels within the SPAD array 11. For example, a macropixel can be set on the basis of respective spot dimeters of light at positions within the SPAD array 11. For example, a macropixel MP1 with 2×2=4 pixels is set at the position L1 in accordance with the spot diameter of light (FIG. 5). In addition, at the position L2, the spot diameter of light is larger than at the position L1 and, accordingly, a macropixel MP2 with 4×4=16 pixels can be set (FIG. 6). By virtue of increasing the size of a macropixel, it is possible to achieve a high ranging performance with a necessary amount of light ensured irrespective of a reduction in imaging performance.

Figure 7:
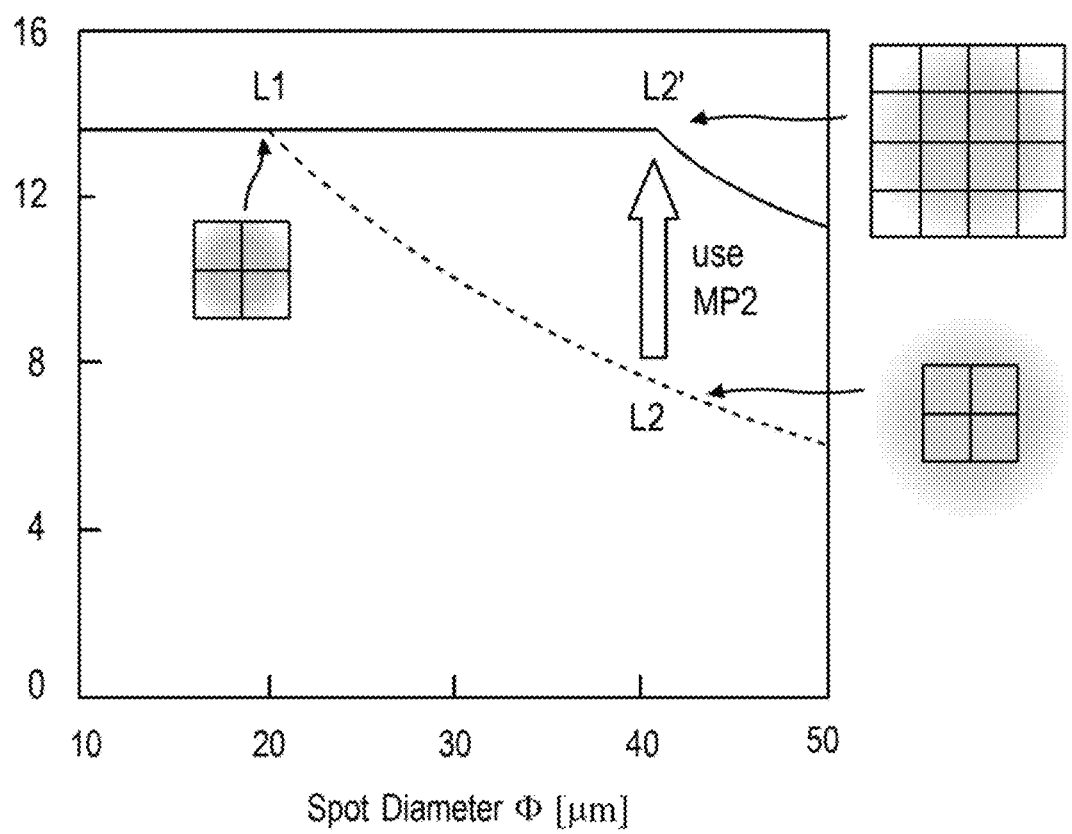
FIG. 7 is a graph illustrating an example of a relationship between the spot diameter of light and a maximum ranging distance.

A graph of FIG. 7 illustrates an example of a relationship between the spot dimeter of light incident on the SPAD array 11 and the maximum ranging distance. An abscissa axis in FIG. 7 represents the spot diameter of light Φ in micrometers (μm). In addition, an ordinate axis in FIG. 7 represents the maximum ranging distance in meters (m). At the position L1, a spotlight with a diameter Φ=20 μm is incident and, accordingly, photon detection is performed using a macropixel containing four of 10-μm-square pixels.

In contrast, a spotlight with a diameter Φ=40 μm is incident at the position L2. If photon detection is performed using a macropixel containing four of the pixels at the position L2 as at the position L1, the maximum ranging distance will be reduced by approximately 40% as compared with at the position L1. Accordingly, photon detection is performed at the position L2 using the macropixel MP2 containing 16 (4×4) of the pixels as indicated by L2' in the graph, which makes it possible to ensure the maximum ranging distance comparable to that at the position L1.

A different type of lens is expected to be used in accordance with a field of view required of the ranging device 1. For example, the imaging performance on the SPAD array 11 varies with a focal distance of an optical system. Accordingly, a user may adjust a macropixel in accordance with the type of a lens in use.

Figure 8:
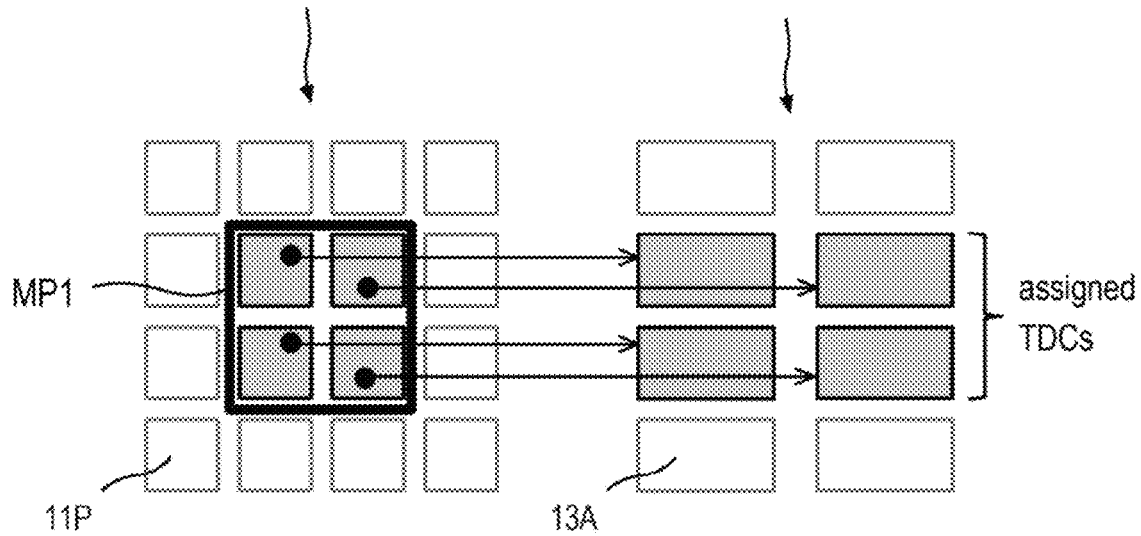
FIG. 8 is a diagram illustrating an example of a case where TDCs are assigned one-to-one to pixels of the SPAD array.
Figure 9:
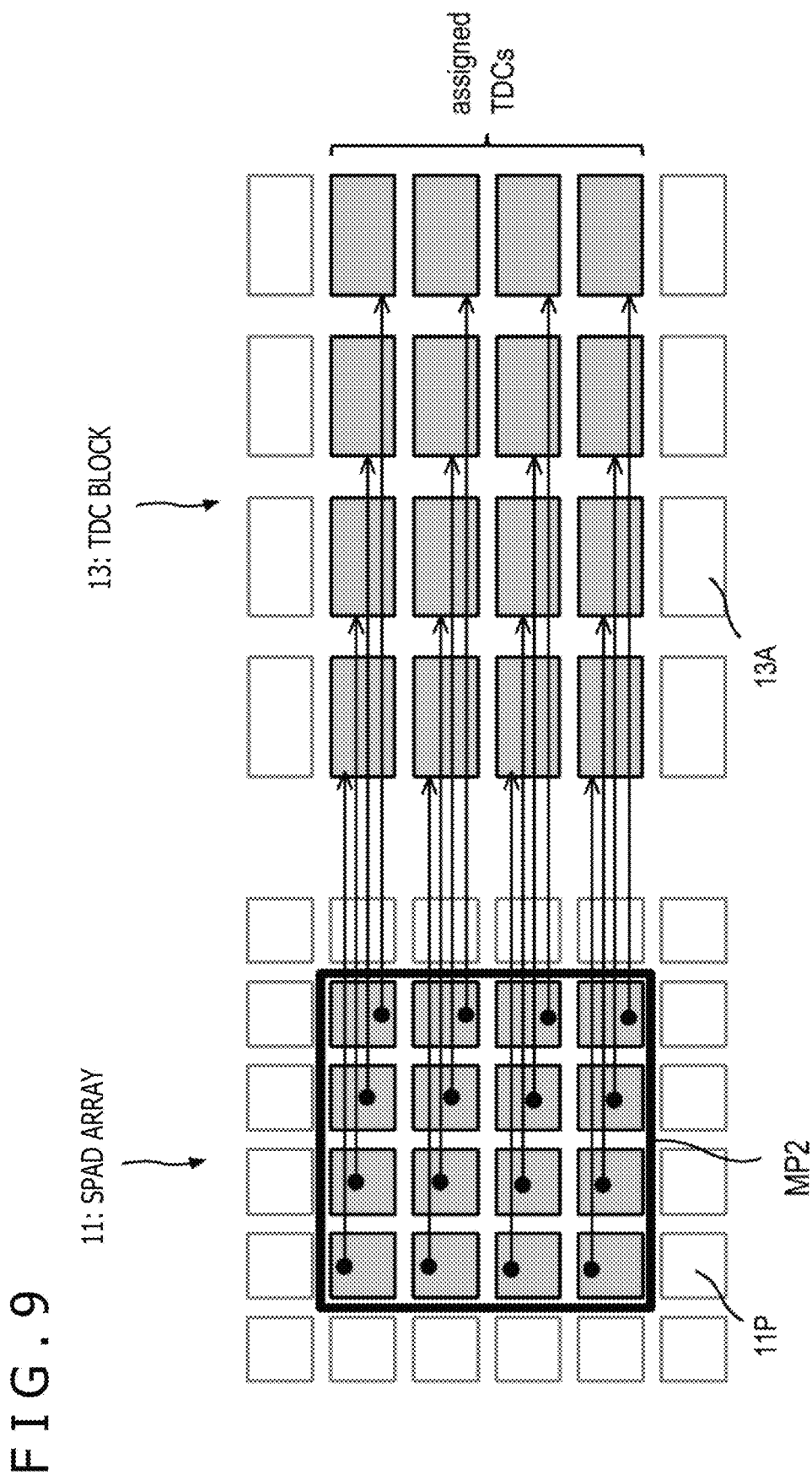
FIG. 9 is a diagram illustrating an example of the case where the TDCs are assigned one-to-one to the pixels of the SPAD array.

FIG. 8 and FIG. 9 each illustrate an example of a case where TDCs are assigned one-to-one to pixels of the SPAD array. In FIG. 8, separate TDCs 13A are assigned to respective four pixels of the macropixel MP1. However, in a case where the separate TDCs 13A are assigned to the respective pixels, an increase in the number of the pixels of the macropixel necessitates an increase in the necessary number of the TDCs 13A. For example, in a case where the macropixel MP2 in FIG. 9 is set, 16 TDCs become necessary. Circuit area and power consumption inevitably increase with an increase in the number of the TDCs 13A mounted in the TDC block 13. Accordingly, as in the light receiving device according to the present disclosure, it is possible to mount TDCs in a manner capable of reducing the necessary number thereof irrespective of an increase in the number of pixels contained in a macropixel.

Figure 10:
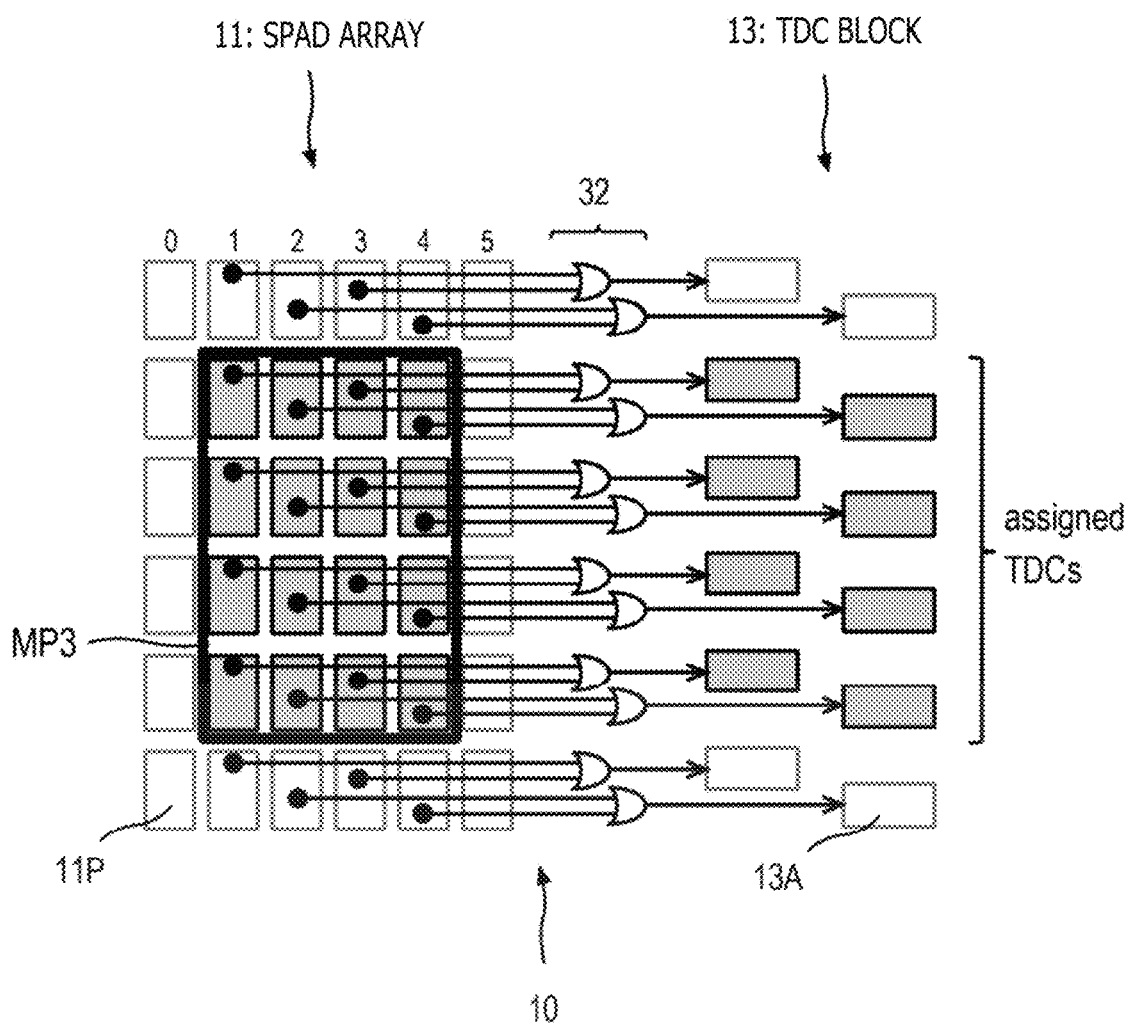
FIG. 10 is a diagram illustrating an example of a coupling relationship between the pixels and the TDCs in the light receiving device according to the present disclosure.

FIG. 10 illustrates an example of a coupling relationship between the pixels and the TDCs in the light receiving device according to the present disclosure. The TDCs 13A can be shared by a plurality of pixels that are not adjacent in either a Row or Column direction within the SPAD array 11 as illustrated in FIG. 10. Among pixels belonging to each row in a macropixel MP3 in FIG. 10, pixels arranged in even-numbered columns have output sides coupled to one of OR gates 32. In addition, among the pixels belonging to each row in the macropixel MP3, pixels arranged in odd-numbered columns have output sides coupled to one of the OR gates 32. Further, output sides of the OR gates 32 are coupled to the respective TDCs 13A. In other words, a signal is to be inputted to each of the TDCs, the signal corresponding to the OR between signals outputted from the pixels arranged in the even-numbered columns or the odd-numbered columns among the pixels in one of the rows. It should be noted that a wired OR may be formed by a connection between signal lines instead of the use of the OR gates.

The macropixel MP3 in FIG. 10 contains 16 of the pixels similarly to the macropixel MP2 in FIG. 9. However, in FIG. 10, the necessary number of the TDCs is reduced by half as compared with in FIG. 9. In the example in FIG. 10, the pixels that share the TDCs are divided by even-numbered column/odd-numbered column to share the TDSs. However, the TDCs may be shared in a pattern different from this. For example, the TDC may be shared by, in each row, the pixels in columns whose numbers are multiples of n (n is an integer of two or more). In addition, a coupling relationship between the plurality of pixels and the TDC may be different in each row within the SPAD array 11.

Description will be made below by taking a case where the pixels not adjacent to each other within the SPAD array 11 share the TDCs as an example. However, the TDCs being shared by the adjacent pixels within the SPAD array 11 is not forbidden. In addition, the coupling relationship between the plurality of pixels within the SPAD array and the TDC in the light receiving device according to the present disclosure may be different from a pattern described here.

Figures 11, 12:
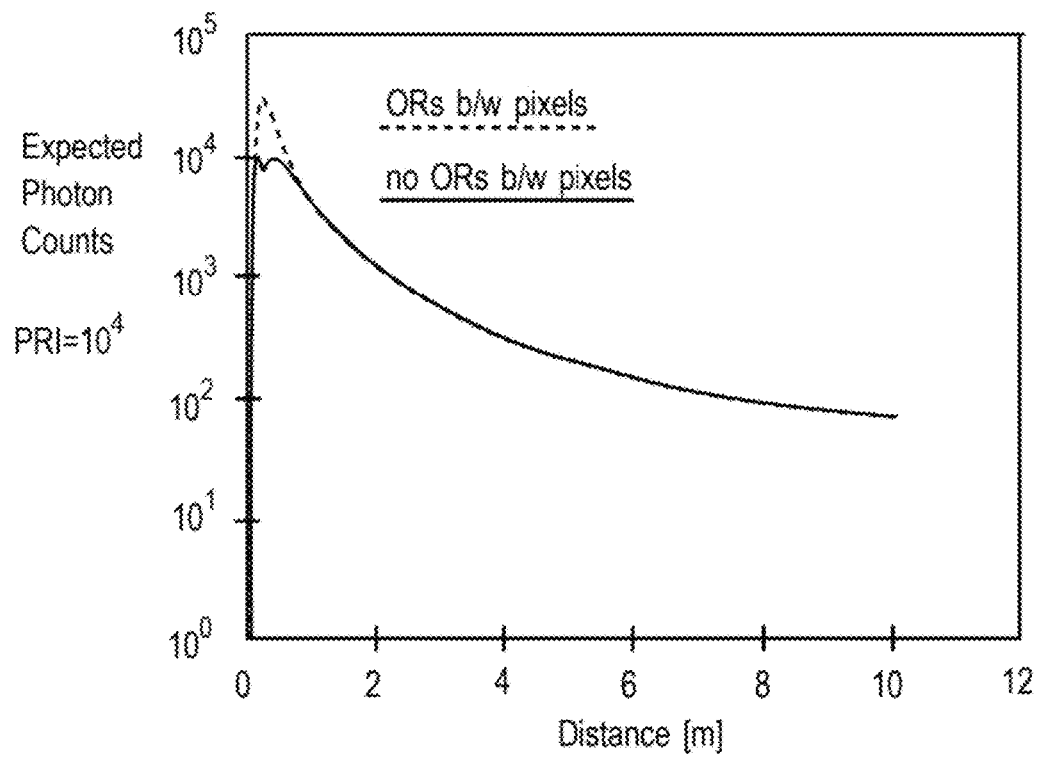
FIG. 11 is a table illustrating an example of expected values of photon detection probability.
FIG. 12 is a graph illustrating an example of a relationship between an expected value of photon detection count and a distance.

A table of FIG. 11 indicates an example of expected values of photon detection probability in a case where two of the pixels (pixel A and pixel B) share one of the TDCs.

p in the table corresponds to a photon detection probability per pixel at a single pulse repetition interval (PRI). The photon detection probability p can be calculated by, for example, dividing a count rate by a PRI frequency. In a case where no OR between signals outputted from the two pixels is taken, an expected value of photon detection probability is 2p. In contrast, in a case where the OR between signals outputted from the two pixels is taken, an expected value of photon detection probability is $2p-p^2$.

A graph of FIG. 12 illustrates an example of a relationship between an expected value of photon detection count and a distance. An abscissa axis of the graph of FIG. 12 represents a distance between the ranging device 1 and a subject. Meanwhile, an ordinate axis of the graph of FIG. 12 represents an expected value of photon detection count. A solid line indicates data regarding a case where no OR between signals outputted from the two pixels is taken. Meanwhile, a broken line indicates data regarding a case where the OR between signals outputted from the two pixels is taken.

For example, in a case where an adequate amount of the reflected light RL is detectable, a value of p is large. With the OR between signals outputted from the two pixels being taken, a photon detection count is reduced at a high photon detection probability (at a large value of p) as illustrated in the graph of FIG. 12. The photon detection count is considerably increased at a large value of p. Even if photons partly fail to be counted in a situation where the photon detection count is considerably increased, the ranging performance is affected to a limited extent by virtue of an adequate amount of photons.

In contrast, in a case where the amount of the reflected light RL incident on the SPAD array 11 is small, the value of p is small. For example, in a case where the distance between the ranging device 1 and the subject is large or in a case where a reflectance of the light EM on the subject is low, the value of p is small. Referring to the graph of FIG. 12, even though the OR between signals outputted from the two pixels is taken, the photon detection count is hardly reduced as long as the value of p is not large. Accordingly, in ranging an object at a distance, an influence of taking the OR between signals outputted from the plurality of pixels is ignorable.

Therefore, the use of the light receiving device according to the present disclosure makes it possible to reduce the number of TDCs with a high ranging performance maintained. Next, description will be made on an example of a method of specifying a macropixel by the control circuit 16.

Figure 13:
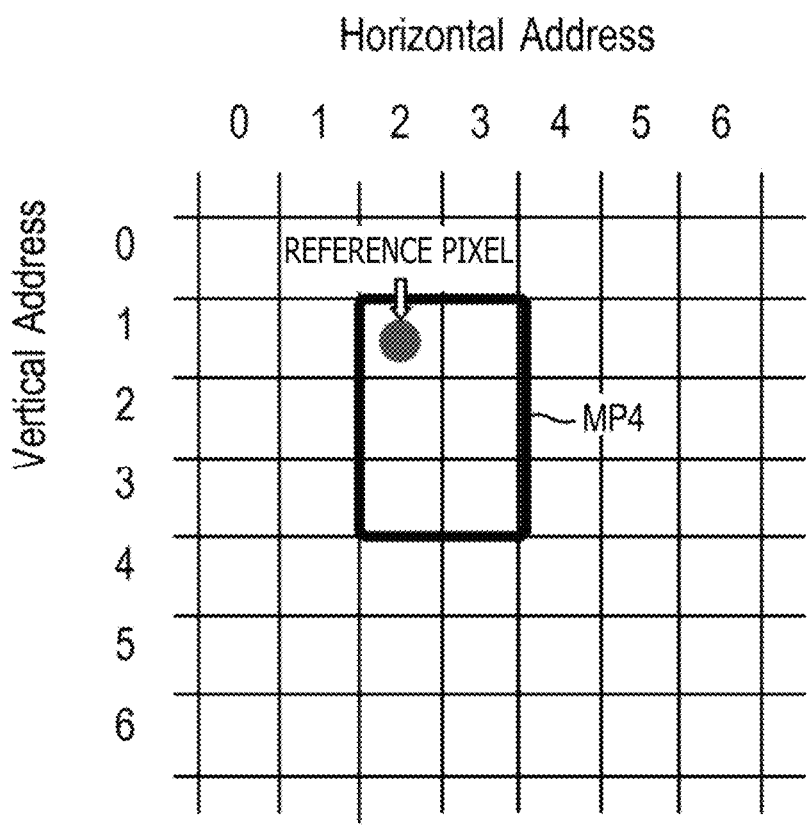
FIG. 13 is a diagram illustrating an example of a method of specifying a micropixel.
Figure 14:
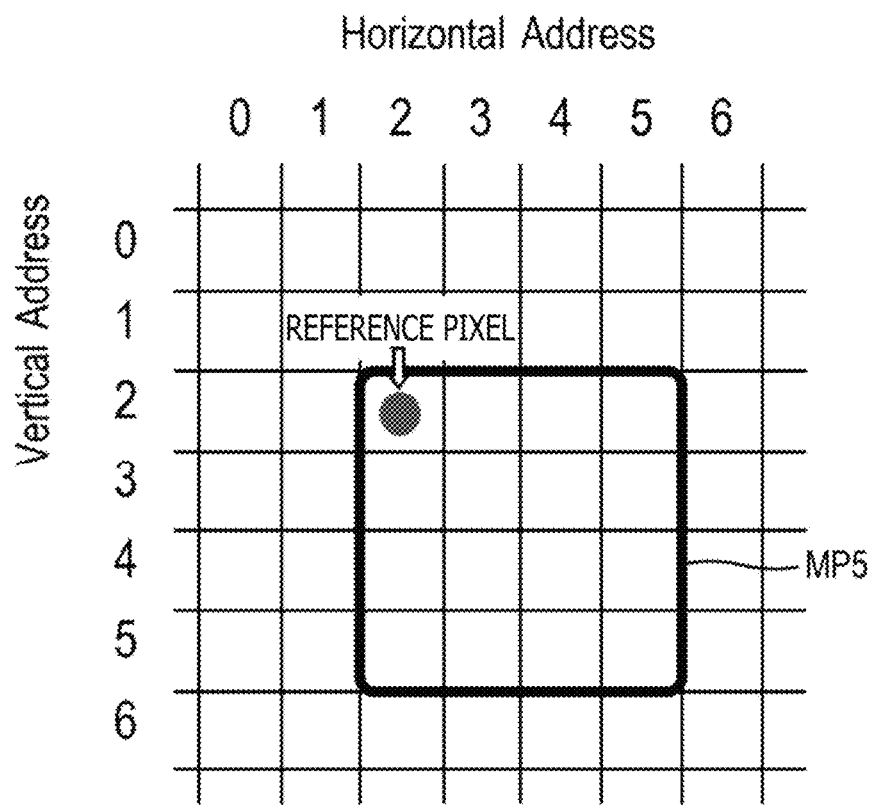
FIG. 14 is a diagram illustrating an example of the method of specifying a micropixel.

FIG. 13 and FIG. 14 each illustrate an example of a method of specifying a macropixel. In a case where an address is assigned to each of the pixels within the SPAD array 11, the control circuit 16 can specify a macropixel on the basis of the address. For example, in a case where a macropixel in a rectangular shape is to be used, the macropixel can be specified by using (1) a base address, (2) the number of pixels in a horizontal direction (the column direction), and (3) the number of pixels in the vertical direction (the row direction). For example, the address of the pixel corresponding to one of corners of the macropixel is usable as the base address. In the examples in FIG. 13 and FIG. 14, the address of the pixel at the corner with the smallest row number and column number is used as the base address. However, the address of any pixel different from this may be used as the base address. A reference pixel in each of FIG. 13 and FIG. 14 refers to a pixel corresponding to the base address. Here, it is assumed that an address is expressed as "(column number, row number)."

A macropixel MP4 in FIG. 13 includes a macropixel where a base address (a reference pixel) is (2, 1), the number of pixels in the horizontal direction is 2, and the number of pixels in the vertical direction is 3. In contrast, a macropixel MP5 in FIG. 14 includes a macropixel where a base address (a reference pixel) is (2, 2), the number of pixels in the horizontal direction is 4, and the number of pixels in the vertical direction is 4.

It should be noted that the control circuit 16 may specify a macropixel in any shape other than a rectangular shape. For example, the control circuit 16 may select, within a region in a rectangular shape, none of the pixels corresponding to the four corners. In addition, the control circuit 16 may specify a macropixel to cause enabled pixels to be distributed around disabled pixels. In addition, a macropixel specified by the control circuit 16 may be in an asymmetric shape.

Figure 15:
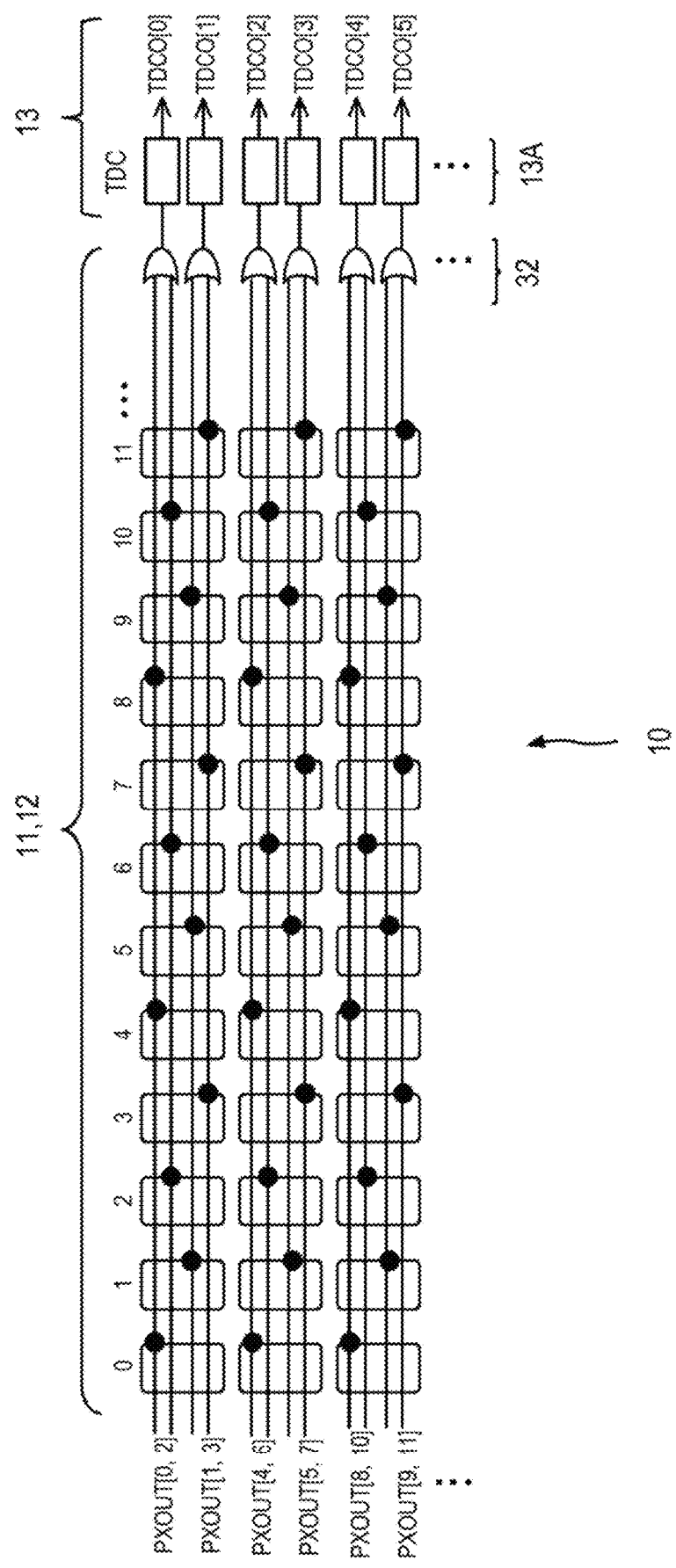
FIG. 15 is a diagram illustrating an example of a connection between the pixels of the SPAD array and the TDCs.

FIG. 15 illustrates an example of a connection between the pixels of the SPAD array 11 and the TDCs. FIG. 15 illustrates pairs of signal lines (leads) PXOUT [0,2], PXOUT [1,3], PXOUT [4,6], PXOUT [5,7], PXOUT [8,10], and PXOUT [9,11]. Among the above, the pairs of signal lines PXOUT [0,2], PXOUT [4,6], and PXOUT [8,10] are coupled to the output sides of the pixels in the even-numbered columns. In contrast, the pairs of signal lines PXOUT [1,3], PXOUT [5,7], and PXOUT [9,11] are coupled to the output sides of the pixels in the odd-numbered columns.

In the example in FIG. 15, the signal lines each connect a plurality of the pixels in the same row to take a wired OR. Here, the plurality of pixels correspond to pixels in columns $c_i+4n$ ($c_i=0$, 1, 2, or 3, n=0, 1, 2 . . . ). However, the signal lines may each be connected to a plurality of the pixels in a pattern different from this. The paired signal lines are each coupled to an input terminal of the same one of the OR gates 32. In addition, the TDC 13A is coupled downstream of each of the OR gates 32. The OR gates 32 thus each input a signal to corresponding one of the TDCs 13A, the signal corresponding to the OR between signals outputted from, in one of the rows, the pixels in the even-numbered columns of the odd-numbered columns.

Next, description will be made on an example of a light receiving circuit corresponding to each of the pixels of the SPAD array 11.

Figure 16:
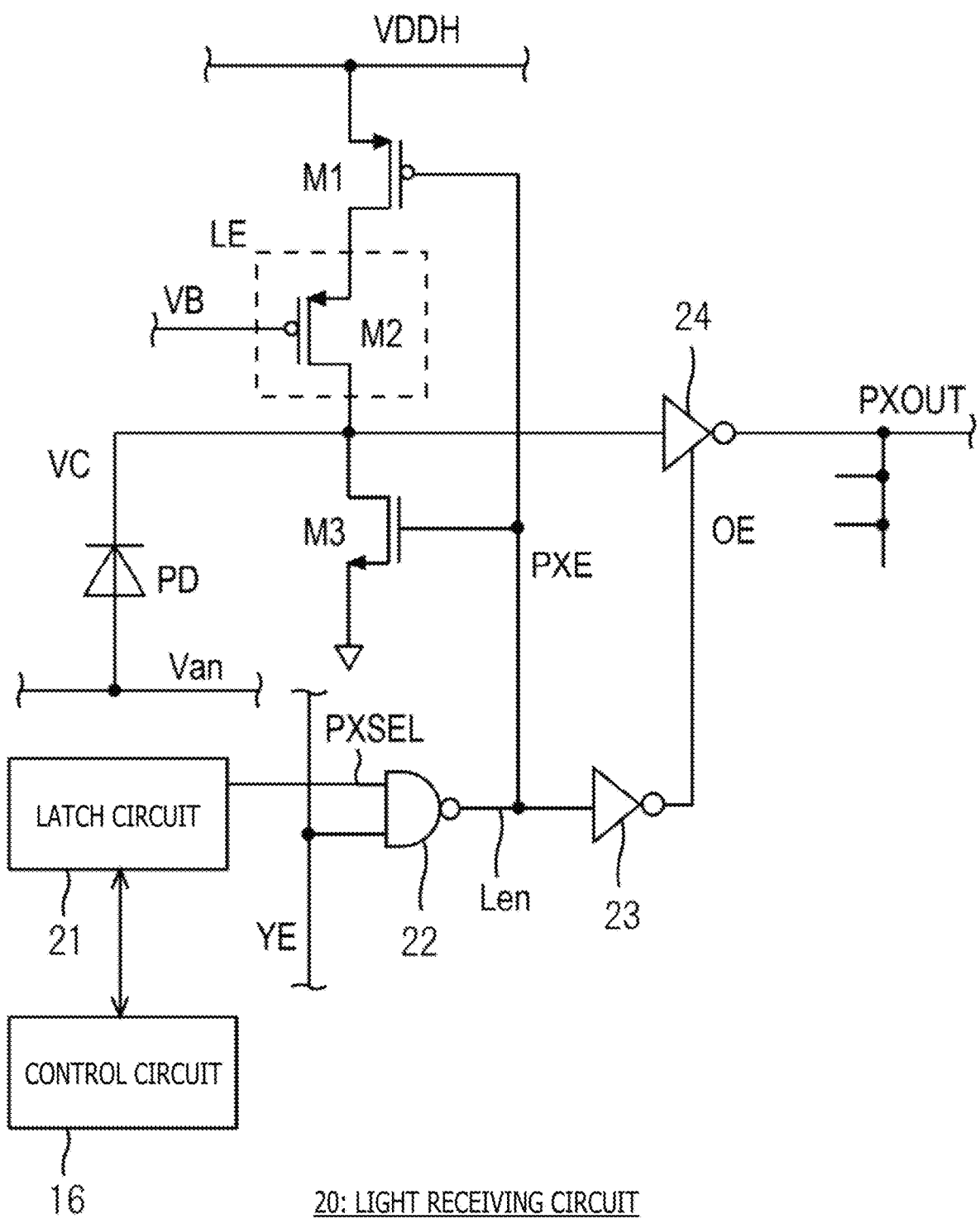
FIG. 16 is a circuit diagram illustrating an example of a light receiving circuit according to the present disclosure.

A circuit diagram of FIG. 16 illustrates an example of a light receiving circuit according to the present disclosure. A light receiving circuit 20 in FIG. 16 includes a photodiode PD, a transistor M1, a transistor M2, a transistor M3, a latch circuit 21, a NAND gate 22, an inverter 23, and an inverter 24. The transistor M1 and the transistor M2 are PMOS transistors. In contrast, the transistor M3 is a NMOS transistor. The photodiode PD is, for example, an avalanche photodiode. For example, a digital circuit including a logical gate, a flip-flop, etc. is usable as the latch circuit. However, a configuration of the latch circuit is not limited.

A voltage Van is applied to an anode of the photodiode PD. The voltage Van can be set to cause an inverse voltage equal to or more than a breakdown voltage to be applied to between terminals of the photodiode PD. In contrast, a cathode of the photodiode PD is coupled to an input side of the inverter 24, a drain of the transistor M2, and a drain of the transistor M3. A source of the transistor M3 is coupled to a ground potential. The ground potential is, for example, a reference potential of a signal, a reference potential of a substrate, or a grounding potential. However, the type of a potential used as the ground potential is not specified. A bias voltage VB is applied to a gate of the transistor M2. A source of the transistor M2 is coupled to a drain of the transistor M1. In addition, a source of the transistor M1 is coupled to a power source potential VDDH.

The transistor M2 corresponds to a load element LE that quenches the photodiode PD. In the light receiving circuit 20 in FIG. 16, a transistor is used as the load element; however, any other type of element may be used as the load element. For example, the load element may include a resistor or a combination of a resistor and a transistor.

An output terminal of the latch circuit 21 is coupled to a first input terminal of the NAND gate 22 through a signal line PXSEL. Meanwhile, an enable line YE of the column is coupled to a second input terminal of the NAND gate 22. In addition, an output terminal of the NAND gate 22 is coupled through a signal line Len to a gate of the transistor M1, a gate of the transistor M3, and an input terminal of the inverter 23. Further, an output terminal of the inverter 23 is coupled to a control terminal of the inverter 24. The output terminal of the inverter 24 is coupled to a signal line (a lead) PXOUT. The output terminal of the inverter 24 corresponds to an output side of the light receiving circuit 20. The signal line PXOUT is coupled to the output sides of a plurality of light receiving circuits 20 to take wired ORs of output signals from the plurality of light receiving circuits 20. The inverter 24 is configured to be turned on/off in response to a voltage applied to the control terminal.

Next, description will be made on an operation of the light receiving circuit 20.

The control circuit 16 sets a voltage of the enable line YE of a column having a pixel that is to be enabled to HIGH. In addition, the control circuit 16 sets the latch circuit 21 of the receiving circuit 20 corresponding to the pixel that is to be enabled in a selected status and sets the latch circuit 21 of the light receiving circuit 20 corresponding to a pixel that is to be disabled in a non-selected status. The latch circuit 21 is configured to apply a HIGH voltage to the signal line PXSEL in the selected status and apply a LOW voltage to the signal line PXSEL in the non-selected status.

First, description will be made on a case where a pixel is enabled (activated) by the control circuit 16 and the voltage of the signal line PXSEL becomes HIGH. At this time, the voltage of the enable line YE of the column is also set to HIGH, which causes an output voltage of the NAND gate 22 to become LOW. The LOW voltage is applied to the gate of the transistor M1 through the signal line Len, which causes a source/drain portion of the transistor M1 to be turned on. In addition, the LOW volage is applied to the gate of the transistor M3, which causes a drain/source portion of the transistor M3 to be turned off. Further, an input voltage of the inverter 23 becomes LOW, which causes the HIGH voltage to be applied to the control terminal of the inverter 24.

This causes a voltage of a source terminal of the transistor M2 to be raised by the power source potential VDDH. In addition, a cathode potential VC of the photodiode PD is separated from the ground potential, which makes it possible to apply an excess bias to between the terminals of the photodiode PD. This allows for photon detection in the Geiger mode. Further, the inverter 24 is turned ON, which makes it possible to output a pulse to the signal line PXOUT in response to detection of a photon.

In response to a photon being incident on the photodiode PD, a current flowing between the terminals of the photodiode PD increases by virtue of avalanche multiplication. At this time, a voltage drop occurs in a drain/source portion of the transistor M2, or load element, with the increase in current. The avalanche phenomenon stops in response to the voltage between the terminals of the photodiode PD dropping to the breakdown voltage, causing the current flowing between the terminals of the photodiode PD to decrease. The photon detection can again become possible in response to the voltage between the terminals of the photodiode PD reaching a value equal to or more than the breakdown voltage.

An increase in the current flowing between the terminals of the photodiode PD causes the cathode potential VC to change from HIGH to LOW. At this time, the voltage of the signal line PXOUT corresponding to an output of the inverter 24 changes from LOW to HIGH. Then, in response to the cathode potential VC returning to HIGH with the stop of the avalanche phenomenon, the inverter 24 outputs the LOW voltage to the signal line PXOUT. The light receiving circuit 20 thus outputs a pulse to the signal line PXOUT in response to a reaction of the photodiode PD with the photon.

The light receiving circuit 20 in FIG. 16 outputs a pulse having a positive polarity to the signal line PXOUT. However, the polarity of the pulse that is to be outputted from the light receiving circuit according to the present disclosure is not specified. In addition, a circuit in which the polarity of the light receiving circuit 20 is inverted is also usable. In a case where the polarity is inverted, it is sufficient if the NMOS transistor and the PMOS transistor in the light receiving circuit 20 are replaced with a PMOS transistor and a NMOS transistor, respectively. In this case, a positive bias voltage is applied to the cathode of the photodiode and the anode of the photodiode is coupled to the output-side inverter. The configuration where the polarity is inverted is also applicable to a later-described light receiving circuit in addition to the light receiving circuit 20.

The light receiving circuit 20 in FIG. 16 is configured to perform passive quenching; however, a quenching method of the photodiode PD is not limited thereto. For example, the LOW voltage may be applied to the gate of the transistor M2 at a timing when a pulse is outputted to the signal line PXSEL to perform active quenching. In addition, the light receiving circuit according to the present disclosure is not necessarily coupled to an enable line. Accordingly, a light receiving device having a configuration where an enable line is omitted may be used.

Next, description will be made on an operation in a case where a pixel is disabled (inactivated) by the control circuit 16 and the voltage of the signal line PXSEL becomes LOW. It should be noted that an operation in a case where the voltage of the enable line YE becomes LOW is similar to this. In this case, the output voltage of the NAND gate 22 becomes HIGH. The HIGH voltage is applied to the gate of the transistor M1 through the signal line Len, which causes the source/drain portion of the transistor M1 to be turned off. In addition, the HIGH voltage is applied to the gate of the transistor M3, which causes the drain/source portion of the transistor M3 to be turned on. Further, the input voltage of the inverter 23 becomes HIGH, which causes the LOW voltage to be applied to the control terminal of the inverter 24.

Figure 17:
FIG. 17 is a table illustrating an example of operation conditions for the light receiving circuit according to the present disclosure.

This causes the source of the transistor M2 to be separated from the power source potential VDDH. In addition, the cathode of the photodiode PD is coupled to the ground potential. This causes no excess bias to be applied to between the terminals of the photodiode PD. Further, the inverter 24 is turned OFF, causing no signal to be outputted to the signal line PXOUT. An output impedance of the inverter 24 in an off status becomes high. This makes it possible to minimize an electrical interference with any other light receiving circuit 20 (pixel) coupled to the signal line PXOUT. This allows for using the same signal line PXOUT as leads of the plurality of light receiving circuits 20. A table of FIG. 17 lists operations of the light receiving circuit 20.

In a case where a connection where the OR of output signals from the plurality of light receiving circuits (pixels) is taken and inputted to the TDC 13A is employed as in FIG. 10 or FIG. 15 described above, sequential reactions of the SPADs within the plurality of light receiving circuits sharing the same TDC 13A are likely to cause a reduction in the number of outputted pulses even though the plurality of reactions occur. Accordingly, the light receiving device according to the present disclosure may be equipped with a function to prevent overlap of a plurality of pulses.

Figure 18:
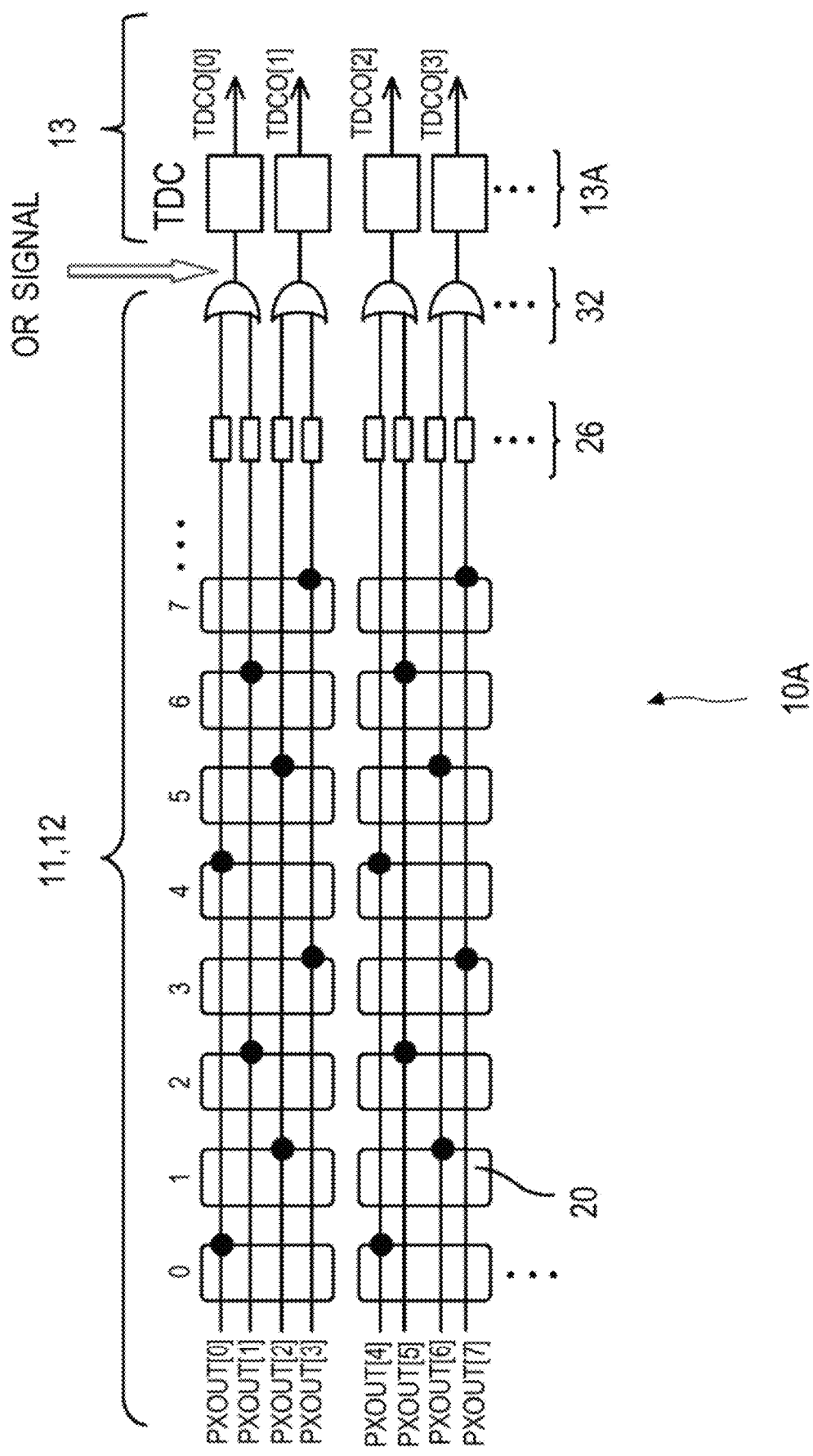
FIG. 18 is a diagram illustrating an example of a connection in a light receiving device according to Modification Example 1.

FIG. 18 illustrates an example of a connection in a light receiving device according to Modification Example 1. A light receiving device 10A in FIG. 18 is provided by adding a plurality of oneshot circuits 26 to the light receiving device 10 in FIG. 15. For example, the oneshot circuits 26 may be located in the respective signal lines PXOUT. In the light receiving device 10A, the oneshot circuits 26 are each coupled between a plurality of light receiving circuits and the input terminal of the OR gate 32. However, the oneshot circuits 26 may each be coupled at a position different from this. For example, the oneshot circuits 26 may each be coupled between the light receiving circuit 20 and the light receiving circuit 20. In addition, the number of the oneshot circuits 26 may be different from that in the example in FIG. 18. For example, the plurality of oneshot circuits 26 may be coupled to each of the signal lines PXOUT.

Figure 19A:
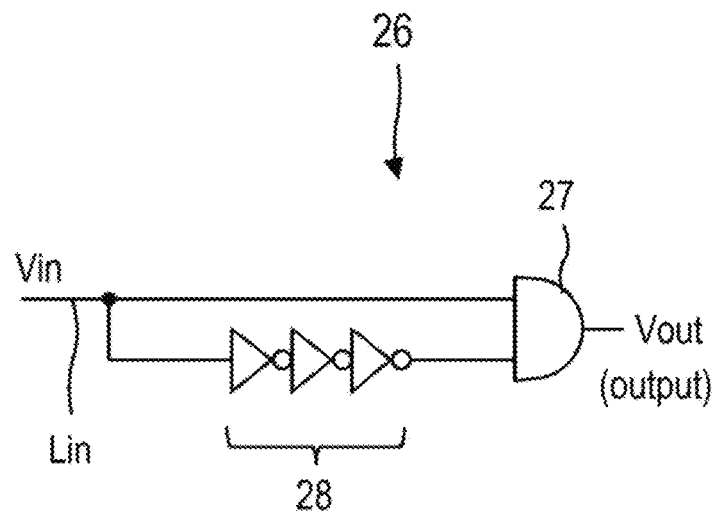
FIGS. 19A and 19B are diagrams illustrating an example of a oneshot circuit and a signal waveform according to Modification Example 1.
Figure 19B:
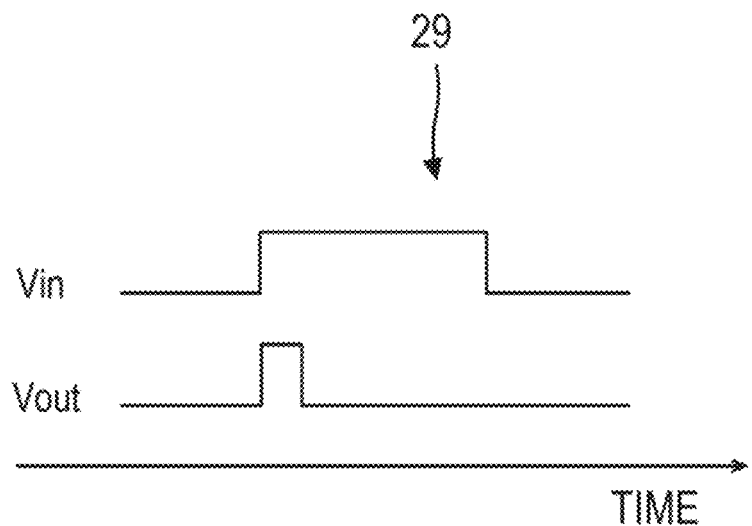

FIGS. 19A and 19B illustrate an example of the oneshot circuit and a signal waveform according to Modification Example 1. FIG. 19A is a circuit diagram illustrating an example of the oneshot circuit. The oneshot circuit 26 in FIGS. 19A and 19B include an AND gate 27 and an inverter chain 28. An input-side signal line Lin of the oneshot circuit 26 is coupled to one of input terminals of the AND gate 27. In addition, the inverter chain 28 is coupled between a branch point of the signal line Lin and the other input terminal of the AND gate 27. In the inverter chain 28 in FIGS. 19A and 19B, three inverters are coupled in series. However, the number of the inverters of the inverter chain may be different from this. For example, the number of the inverters can be determined according to a necessary pulse width in a downstream circuit such as the TDC 13A.

Here, an operation of each of the oneshot circuits 26 will be described by taking a case where a pulse having a positive polarity is generated in the light receiving circuit as an example.

In response to a pulse being outputted from the light receiving circuit, a voltage of the one of the input terminals of the AND gate 27 changes from LOW to HIGH. Then, a voltage of the other input terminal of the AND gate changes from LOW to HIGH with a delay due to the inverter chain 28. At a timing when the voltages of both the input terminals of the AND gate 27 become HIGH, an output voltage of the AND gate 27 changes from LOW to HIGH. In response to the voltage of the one of the input terminals of the AND gate 27 changing from HIGH to LOW after the elapse of a pulse duration, the output voltage of the AND gate 27 also changes from LOW to HIGH.

Thus, the oneshot circuit 26 outputs a pulse shorter in width than the inputted pulse as illustrated in a graph of FIG. 19B. In other words, the oneshot circuit 26 converts a pulse generated in the light receiving circuit to a pulse shorter in width. This makes it possible to lower a probability for pulses generated in the plurality of light receiving circuits to overlap in the signal line PXOUT to maintain a ranging performance.

A graph of FIG. 20 illustrates an example of a signal waveform in the light receiving device. In the example in FIG. 20, the SPAD of each of the light receiving circuit coupled to the signal line PXOUT[0] and the light receiving circuit coupled to the signal line PXOUT[1] reacts with a photon. Thus, pulses overlapping in duration are outputted to the signal line PXOUT[0] and the signal line PXOUT[1]. In a case where no oneshot circuit is provided, the OR of the pulse in the signal line PXOUT[0] and the pulse in the signal line PXOUT[1] is taken through the OR gate 32. Thus, the two pulses are integrated into a single pulse and the number of counts of photons in a downstream circuit becomes "1."

In contrast, in a case where the oneshot circuits 26 are coupled upstream of the OR gates 32 as in the light receiving device 10A in FIG. 18, a pulse in the signal line PXOUT[0] and a pulse in the signal line PXOUT[1] are each converted to a pulse having a shorter width before being inputted to the OR gate 32. This prevent the two pulses from overlapping even though the OR of both the signals is taken through the OR gate 32, which makes it possible to obtain the correct number of counts of photons "2" in a downstream circuit.

Figure 21:
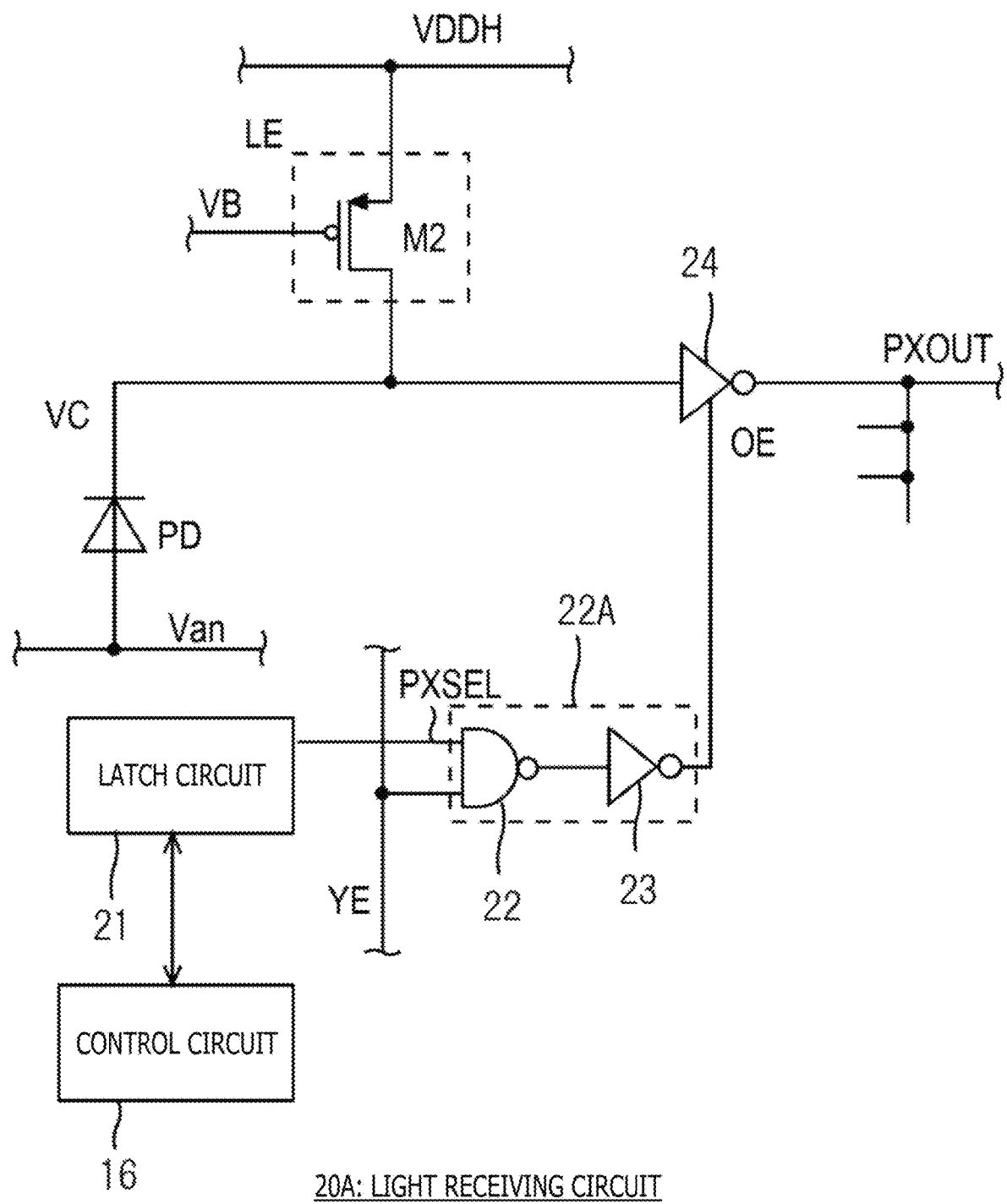

A circuit diagram of FIG. 21 illustrates an example of a light receiving circuit according to Modification Example 2. A light receiving circuit 20A in FIG. 21 corresponds to a circuit from which the transistor M1 and the transistor M3 of the light receiving circuit 20 in FIG. 16 are omitted. The light receiving circuit 20A in FIG. 21 includes the photodiode PD, the transistor M2, the latch circuit 21, the NAND gate 22, the inverter 23, and the inverter 24. The transistor M2 includes a PMOS transistor. The photodiode PD includes, for example, an avalanche photodiode.

The voltage Van is applied to the anode of the photodiode PD. The voltage Van can be set to cause an inverse voltage equal to or more than a breakdown voltage to be applied to between terminals of the photodiode PD. Meanwhile, the cathode of the photodiode PD is coupled to the input side of the inverter 24 and the drain of the transistor M2. The source of the transistor M2 is coupled to the power source potential VDDH. The bias voltage VB is applied to the gate of the transistor M2.

The output terminal of the latch circuit 21 is coupled to the first input terminal of the NAND gate 22 through the signal line PXSEL. Meanwhile, the enable line YE of the column is coupled to the second input terminal of the NAND gate 22. In addition, the output terminal of the NAND gate 22 is coupled to the input terminal of the inverter 23. Further, the output terminal of the inverter 23 is coupled to the control terminal of the inverter 24. The output terminal of the inverter 24 is coupled to the signal line (the lead) PXOUT. The output terminal of the inverter 24 corresponds to an output side of the light receiving circuit 20A. The signal line PXOUT is coupled to the output sides of a plurality of light receiving circuits to take wired ORs of output signals from the plurality of light receiving circuits. The inverter 24 is configured to be turned on/off in response to a voltage applied to the control terminal. It should be noted that, in the light receiving circuit 20A in FIG. 21, an AND gate 22A may be used in place of the NAND gate 22 and the inverter 23.

Next, description will be made on an operation of the light receiving circuit 20A.

The control circuit 16 sets the voltage of the enable line YE of a column having a pixel that is to be enabled to HIGH. In addition, the control circuit 16 sets the latch circuit 21 of the light receiving circuit 20A corresponding to the pixel that is to be enabled in a selected status and sets the latch circuit 21 of the light receiving circuit 20A corresponding to a pixel that is to be disabled in a non-selected status. The latch circuit 21 is configured to apply a HIGH voltage to the signal line PXSEL in the selected status and apply a LOW voltage to the signal line PXSEL in the non-selected status.

First, description will be made on a case where a pixel is enabled (activated) by the control circuit 16 and the voltage of the signal line PXSEL becomes HIGH. At this time, the voltage of the enable line YE of the column is also set to HIGH, which causes the output voltage of the NAND gate 22 to become LOW. The input voltage of the inverter 23 becomes LOW, which causes the HIGH voltage to be applied to the control terminal of the inverter 24. The inverter 24 is turned ON, which makes it possible to output a pulse to the signal line PXOUT in response to detection of a photon.

In response to a photon being incident on the photodiode PD, a current flowing between the terminals of the photodiode PD increases by virtue of avalanche multiplication. At this time, a voltage drop occurs in the drain/source portion of the transistor M2, or load element, with the increase in current. The avalanche phenomenon stops in response to the voltage between the terminals of the photodiode PD dropping to the breakdown voltage, causing the current flowing between the terminals of the photodiode PD to decrease. The photon detection can become possible again in response to the voltage between the terminals of the photodiode PD reaching a value equal to or more than the breakdown voltage.

An increase in the current flowing between the terminals of the photodiode PD causes the cathode potential VC to change from HIGH to LOW. At this time, the voltage of the signal line PXOUT corresponding to an output of the inverter 24 changes from LOW to HIGH. Then, in response to the cathode potential VC returning to HIGH with the stop of the avalanche phenomenon, the inverter 24 outputs the LOW voltage to the signal line PXOUT. This allows the light receiving circuit 20 to output a pulse having a positive polarity to the signal line PXOUT in response to a reaction of the photodiode PD with the photon.

Next, description will be made on an operation in a case where a pixel is disabled (inactivated) by the control circuit 16 and the voltage of the signal line PXSEL becomes LOW. It should be noted that an operation in a case where the voltage of the enable line YE becomes LOW is similar to this. In this case, the output voltage of the NAND gate 22 becomes HIGH. The input voltage of the inverter 23 becomes HIGH, which causes the LOW voltage to be applied to the control terminal of the inverter 24. The inverter 24 is turned OFF, causing no signal to be outputted to the signal line PXOUT. The output impedance of the inverter 24 in an off status becomes high, which makes it possible to minimize an electrical interference with any other light receiving circuit (pixel) coupled to the signal line PXOUT. This allows for using the same signal line PXOUT as leads of the plurality of light receiving circuits.

By virtue of omission of the transistor M1 and the transistor M3 in FIG. 16, the light receiving circuit 20A in FIG. 21 can have a simplified circuit configuration with a mounting area being reduced. However, in a case where the light receiving circuit 20A is used, an excess bias is kept being applied to between the terminals of the photodiode PD even in the light receiving circuit corresponding to the pixel disabled by the control circuit 16. An electric power is thus consumed when the photodiode PD reacts with a photon.

It should be noted that the pixels of the SPAD array 11 may each include a mix of the above-described light receiving circuit 20 and light receiving circuit 20A. In addition, the above-described light receiving circuits 20 and 20A are merely examples of a circuit usable as each of the pixels of the SPAD array 11. Accordingly, a light receiving circuit different in configuration from the above-described light receiving circuits 20 and 20A may be mounted as each of the pixels of the SPAD array 11.

Here, the configuration of the light receiving circuit according to the present disclosure will be organized.

The light receiving circuit according to the present disclosure may include a light detector, a load element, a latch circuit, and a first inverter. The load element is coupled between the light detector and a first reference potential. The latch circuit is configured to output a first voltage corresponding to a status. The first inverter is configured to be turned on in response to a second voltage applied to a control terminal and to invert and output an output voltage of the light detector. The second voltage to be applied to the control terminal is variable according to the first voltage.

The above-described photodiode PD is an example of the light detector. The load element LE or the transistor M2 is an example of the load element. The inverter 24 is an example of the first inverter. The power source potential VDDH is an example of the first reference potential.

The light receiving circuit according to the present disclosure may further include an AND gate having a first input terminal coupled to an output side of the latch circuit, a second input terminal coupled to an enable line, and an output terminal coupled to the control terminal of the first inverter. The AND gate 22A in FIG. 21 is an example of the AND gate. The enable line YE of the column is an example of the enable line.

The light receiving circuit according to the present disclosure may further include a NAND gate having a first input terminal coupled to the output side of the latch circuit and a second input terminal coupled to the enable line and a second inverter coupled between the NAND gate and the control terminal. The NAND gate 22 is an example of the NAND gate. The inverter 23 is an example of the second inverter.

In addition, the light receiving circuit according to the present disclosure may further include the NAND gate, a first transistor of a first conductivity type, a second transistor of a second conductivity type, and the second inverter. The NAND gate has the first input terminal coupled to the output side of the latch circuit and the second input terminal coupled to the enable line. The first transistor is coupled between the first reference potential and the load element and turned on in response to an output voltage of the NAND gate. The second transistor is coupled between the output side of the light detector and the second reference potential and turned on in response to the output voltage of the NAND gate. The second inverter is coupled between an output terminal of the NAND gate and the control terminal of the first inverter.

A P-MOS transistor is usable as the transistor of the first conductivity type and an N-MOS transistor is usable as the transistor of the second conductivity type. In this case, a power source potential is usable as the first reference potential and a ground potential is usable as the second reference potential. In addition, using an N-MOS transistor as the transistor of the first conductivity type and a P-MOS transistor as the transistor of the second conductivity type is also acceptable. In this case, the ground potential is usable as the first reference potential, and the power source potential is usable as the second reference potential. The transistor M1 in FIG. 16 is an example of the first transistor. The transistor M3 in FIG. 16 is an example of the second transistor. In addition, the light detector may be an avalanche photodiode.

By virtue of the use of the light receiving circuit according to the present disclosure, only necessary one of the pixels within the SPAD array 11 can be enabled while the rest of the pixels are disabled. This makes it possible to reduce the power consumption of the light receiving device. For example, the control circuit 16 can enable a pixel where the amount of the reflected light RL is large and disable a pixel where the amount of the reflected light RL is small. This makes it possible to minimize an influence of a background light (a disturbance light) to increase a brightness dynamic range and a ranging distance where ranging is possible. Accordingly, description will be made below on a shape of a macropixel that can be set in accordance with a spotlight.

Figure 22:
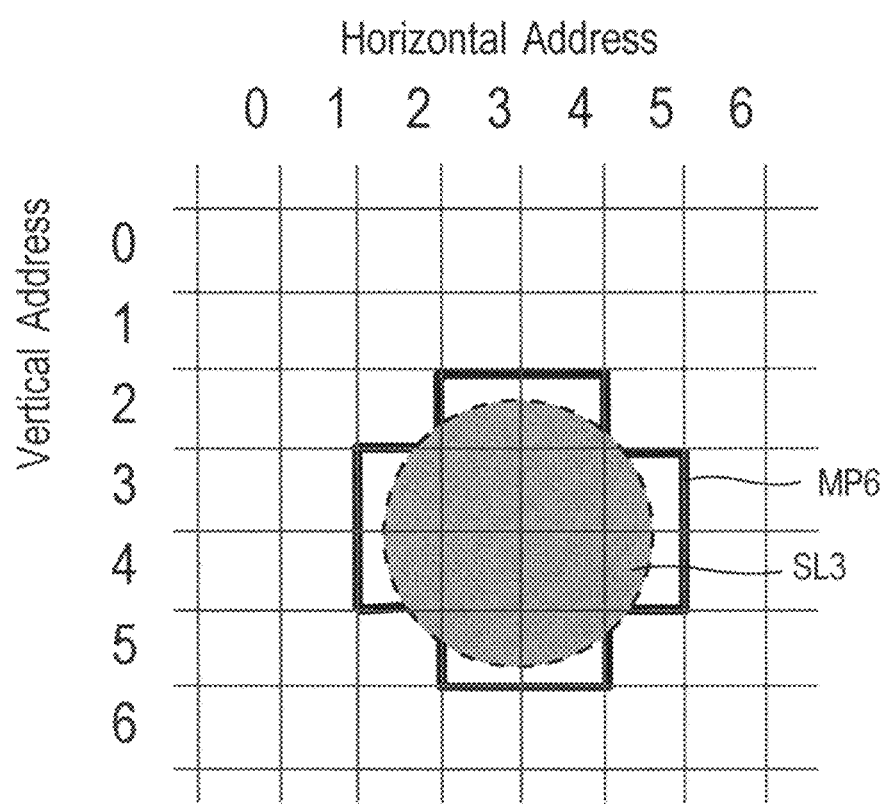
Figure 23:
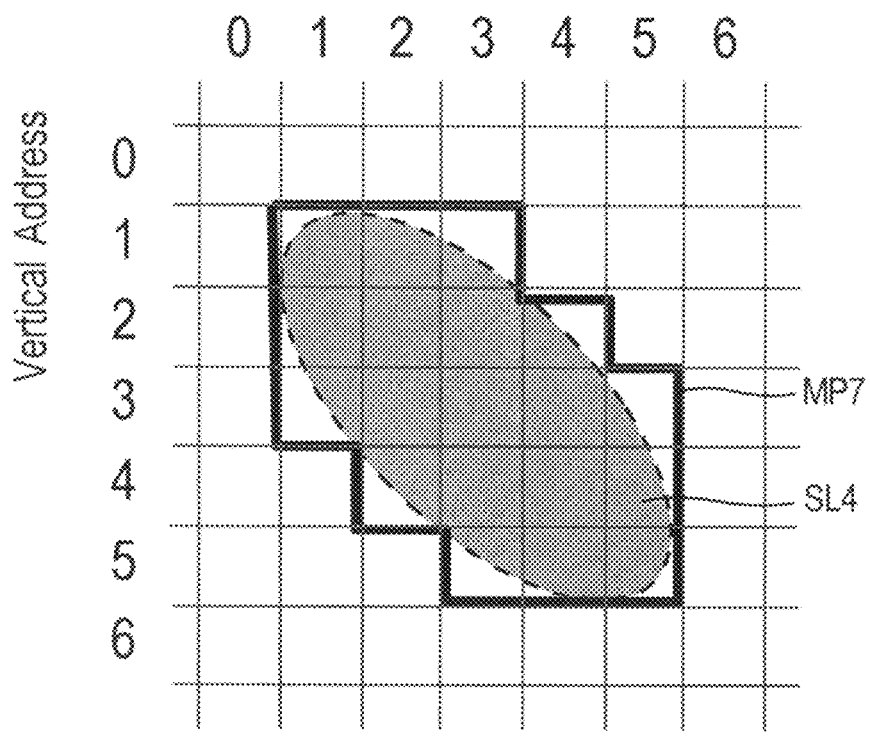
Figure 24:
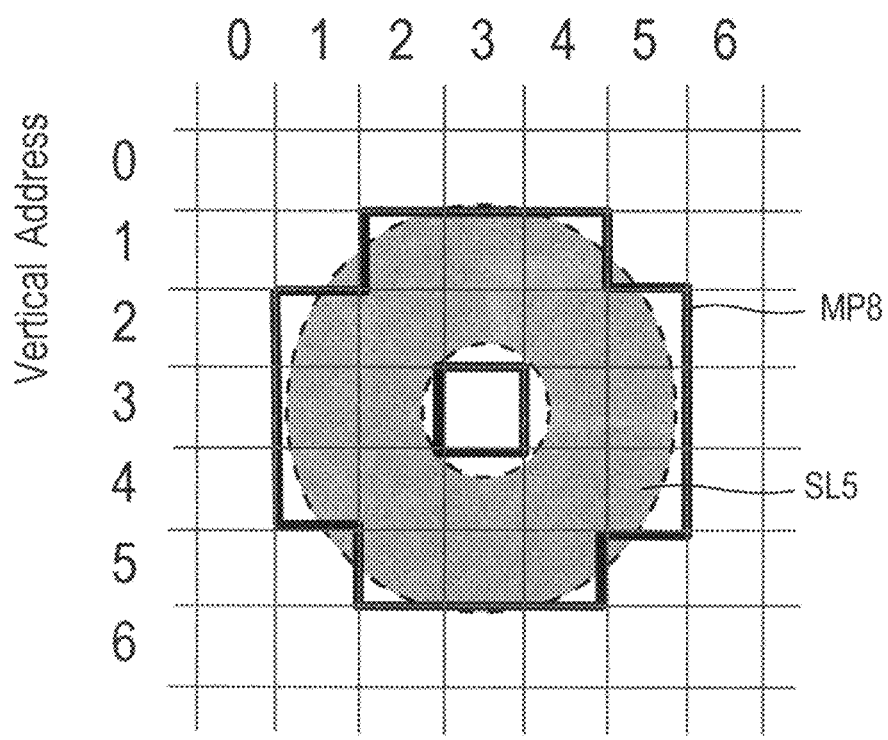

Plan views of FIG. 22 to FIG. 24 each illustrate an example of the shape of a macropixel. A spotlight SL3 in FIG. 22 is in a circular shape. In this case, if a macropixel in a square shape or a rectangular shape is set, a pixel where the amount of the reflected light RL is small is unintentionally enabled. Accordingly, the control circuit 16 can set a macropixel MP6 in a cross shape as in the example in FIG. 22.

The shape of a spotlight on the SPAD array 11 is likely to deform due to a factor such as misalignment of the optical system. For example, a spotlight in an oval shape such as a spotlight SL4 in FIG. 23 may be formed. In this case, the control circuit 16 can set a macropixel in a polygonal shape covering a region of the spotlight, such as a macropixel MP7 in FIG. 23.

The amount of light within a region irradiated with a spotlight on the SPAD array 11 is not always constant. For example, the irradiated region is likely to have a part with a smaller amount of light. For example, a spotlight SL5 in FIG. 24 is an annular shape. In this case, the control circuit 16 can set a macropixel MP8 where a disabled pixel region is surrounded by an enabled pixel region.

The shapes of macropixels illustrated in FIG. 22 to FIG. 24 are merely by way of example. Accordingly, the control circuit 16 may set a macropixel in a shape different from these. As described above, the control circuit 16 can set a macropixel in accordance with the shape or the amount of a spotlight. This makes it possible to reduce power consumption and perform highly accurate ranging with less noise. The use of the light receiving device according to the present disclosure makes it possible to flexibly enable/disable individual pixels irrespective of an output-side connection of a plurality of pixels (light receiving circuits).

Next, a detailed description will be made on a macropixel setting process in the light receiving device according to the present disclosure.

Figure 25:
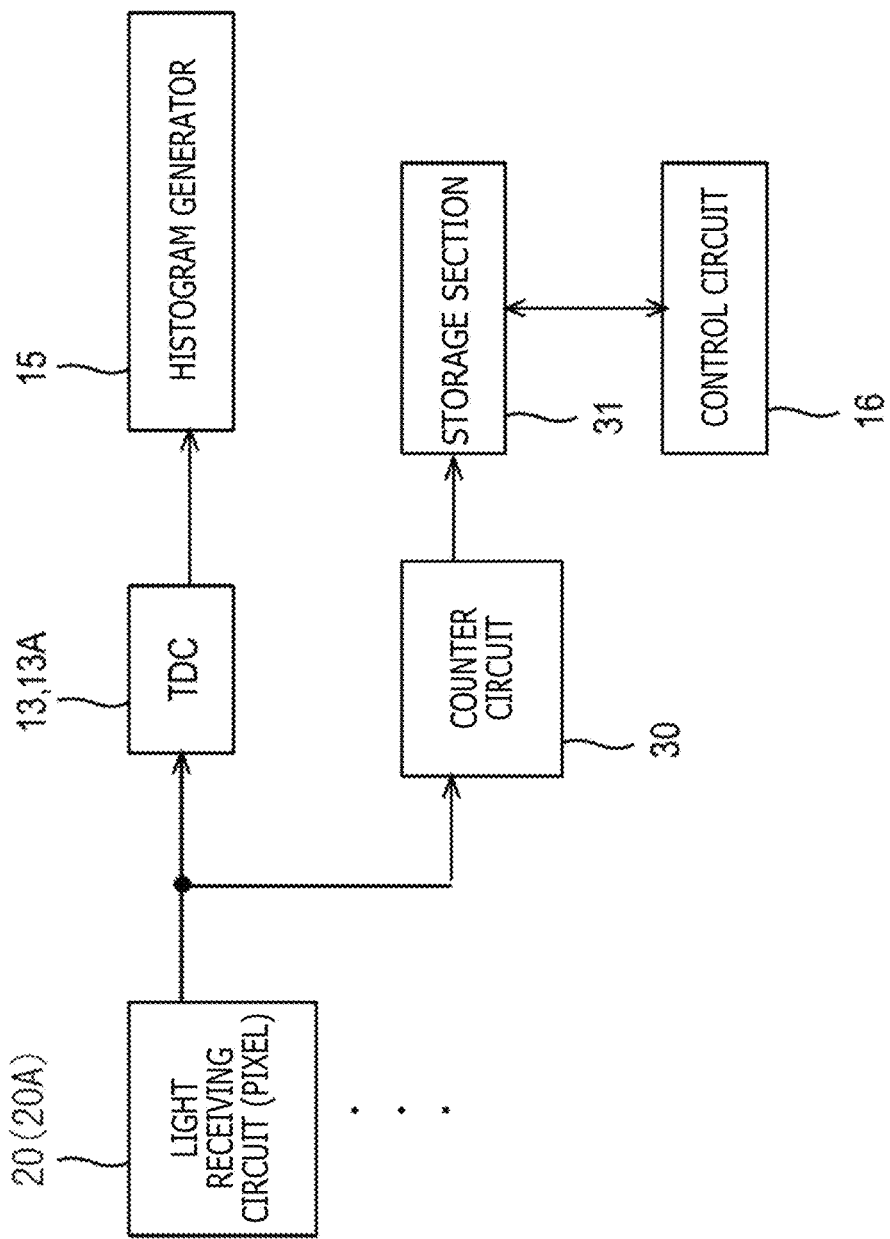

FIG. 25 illustrates an example of components related to enabling and disabling pixels. As illustrated in FIG. 25, the light receiving device according to the present disclosure may further include a counter circuit 30 and a storage section 31. For example, the counter circuit 30 may be coupled downstream of at least one of the plurality of light receiving circuits (pixels) within the SPAD array 11. The counter circuit 30 counts the number of photons detected by the light receiving circuit. The counter circuit 30 causes the storage section 31 to store the number of counts of photons along with information regarding an address of the light receiving circuit. The control circuit 16 can access the storage section 31 and refer to the number of counts of photons in the light receiving circuit (the pixel) at each address.

A table of FIG. 26 illustrates an example of the number of counts of photons in the plurality of light receiving circuits (pixels) within the SPAD array 11. For example, the control circuit 16 can obtain photon count data during a predetermined period by enabling all or at least one of the pixels within the SPAD array 11.

The counter circuit 30 may be prepared for each light receiving circuit as in the example in FIG. 25. However, a counter circuit may be shared by a plurality of light receiving circuits. For example, a single counter circuit may count the numbers of photons detected in a plurality of light receiving circuits. In this case, the counter circuit may count the total number of photons detected in the plurality of light receiving circuits (pixels) to which the counter circuit is coupled. Alternatively, the counter circuit may count the number of photons detected in each of the light receiving circuits (pixels).

The register 17 of the control circuit 16 may be used as the above-described storage section 31. Alternatively, the storage section 31 may be any other volatile memory, non-volatile memory, or storage device. An example of the non-volatile memory is a NOR flash memory, a NAND flash memory, a resistance random access memory, or a magnetoresistive random access memory. In addition, an example of the volatile memory is an SRAM or a DRAM. An example of the storage device is a hard disk drive, a magnetic tape, or an optical dick. However, the type of the memory/storage device used in the storage section 31 is not specified.

It should be noted that a part of components of the light receiving device is omitted in FIG. 25 for the convenience of explanation. Accordingly, the light receiving device according to the present disclosure may further include another component as illustrated by way of example in FIG. 2, FIG. 15, and FIG. 18.

Figure 27:
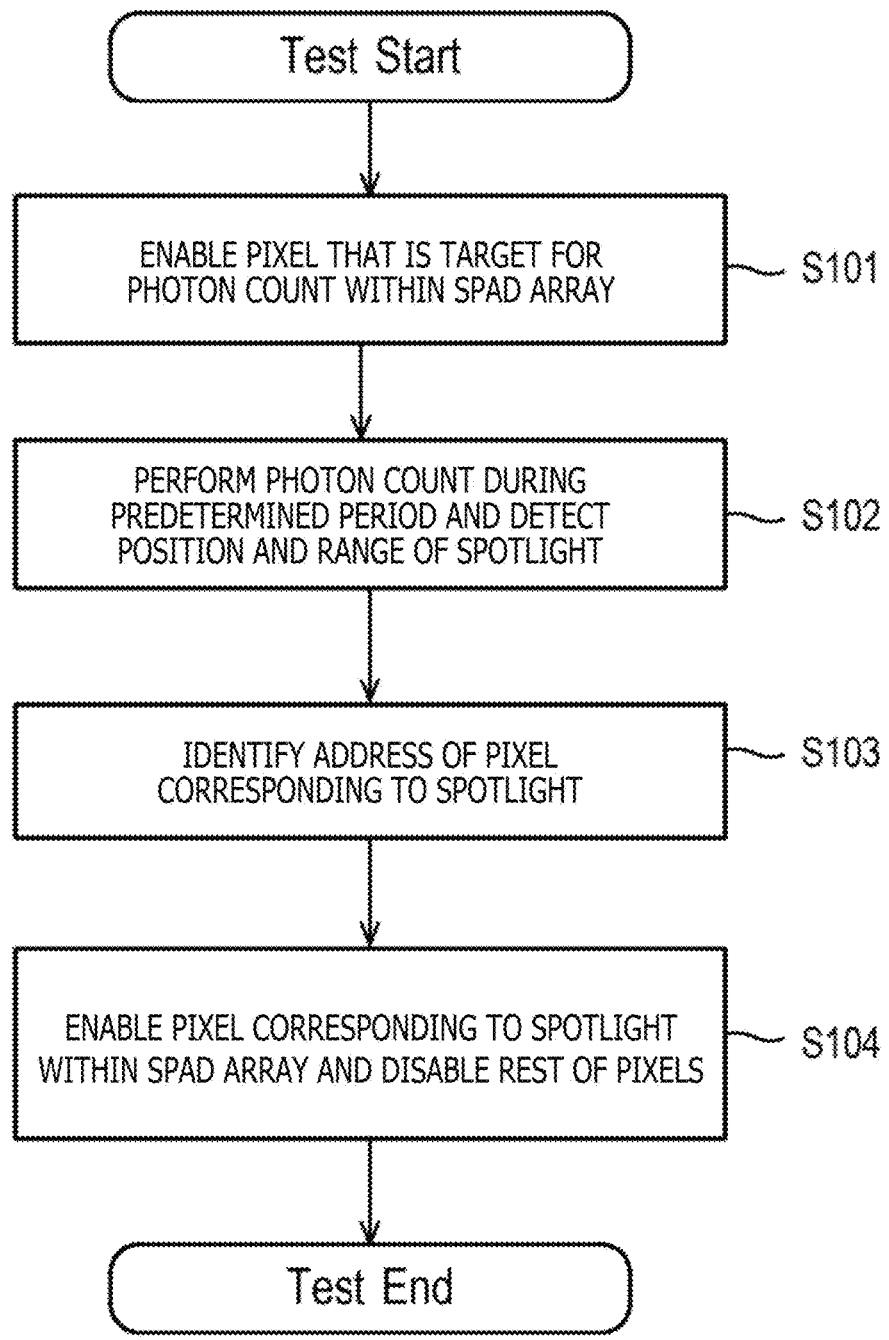

A flowchart of FIG. 27 illustrates an example of the macropixel setting process. Description will be made below on the process with reference to the flowchart of FIG. 27.

The control circuit 16 first enables the pixel that is a target for photon count within the SPAD array 11 (Step S101). In Step S101, the control circuit 16 may enable all of the pixels within the SPAD array 11 or a part of the pixels within the SPAD array 11. For example, the control circuit 16 can enable the pixel having an optically unshielded upper surface and where the reflected light RL is likely to be incident. However, a range of pixels to be enabled in Step S101 is not limited. In a case where the macropixel setting process is to be performed in parts at a plurality of timings, the control circuit 16 may enable a part of divided regions within the SPAD array 11.

The light receiving device then performs photon count during a predetermined period and detects a position and a range of a spotlight (Step S102). The photon count is performed during the predetermined period and photon count data (for example, FIG. 26) is stored in the storage section 31. The length of the period when the photon count is to be performed is not specified. The control circuit 16 can determine that a spotlight is incident on the pixel where the number of counts of photons exceeds a threshold th in Step S102. In the example in FIG. 26, 250 is used as the threshold th. The threshold th used by the control circuit 16 is not necessarily a fixed value.

For example, the control circuit 16 may adjust the threshold th in accordance with the number of counts within the photon count data so that continuous ones of the pixels within the SPAD array 11 can be selected as pixels (a macropixel) to be enabled. It should be noted that a pixel with a small number of counts is assumed to have a reaction mainly with a photon of a background light (a disturbance light).

Next, the control circuit 16 identifies the address of the pixel corresponding to the spotlight (Step S103). For example, the control circuit 16 can identify the address of the pixel where the number of counts exceeds the threshold th. In the example in FIG. 26, the control circuit 16 identifies a macropixel MP9 corresponding to continuous pixel region where the number of counts in Step S103 exceeds the threshold th within the SPAD array 11.

At the end, the control circuit 16 enables the pixel corresponding to the spotlight within the SPAD array 11 and disables the rest of the pixels (Step S104). In the example in FIG. 26, the control circuit 16 can enable the pixels corresponding to the macropixel MP9 and disable the rest of the pixels. It should be noted that the control circuit 16 may select one of shapes of a macropixel, which are defined in advance, in accordance with a distribution of the pixels where the number of counts exceeds the threshold th and enable the pixels corresponding to the shape.

The control circuit 16 can enable/disable the pixels within the SPAD array 11 by, for example, the method described in the above explanation of the receiving circuits 20 and 20A. However, the pixels may be enabled/disabled by any other method. The light receiving device may be configured to enable/disable the individual pixels within the SPAD array 11. Alternatively, the light receiving device may enable/disable the pixels within the SPAD array 11 in units of group.

FIG. 26 illustrates a part of the pixels within the SPAD array 11. FIG. 26 thus illustrates no macropixel except the macropixel MP9. However, it is needless to say that the light receiving device according to the present disclosure may simultaneously set a plurality of macropixels. In a region including the vicinity of a periphery of the SPAD array 11, a macropixel of a position, a size, or a shape of which corresponds to a spot aberration can be set by performing the flowchart of FIG. 27.

For example, the process of the flowchart of FIG. 27 can be performed (1) during adjustment prior to the shipping of the light receiving device, (2) when the light receiving device is turned on, (3) when a user provides a test command during operation of the light receiving device, or (4) in a predetermined cycle during operation of the light receiving device. The pixel enabled within the SPAD array 11 and the spotlight are likely to be misaligned by a factor such as a change in a member due to vibration, impact, or temperature or a change in a member with time after the shipping of a product. Accordingly, a reduction in ranging performance can be prevented by performing the process of the flowchart of FIG. 27 at the above-described timings (2) to (4).

Here, the configuration of a light receiving device according to the present disclosure will be organized.

The light receiving device according to the present disclosure may include a light detector array where a plurality of the above-described light receiving circuits are arranged and a control circuit configured to change a status of a latch circuit in at least one of the light receiving circuits within the light detector array. The above-described SPAD array 11 is an example of the light detector array.

In addition, the light receiving device according to the present disclosure may further include a counter circuit configured to count the number of pulses outputted from at least one of the light receiving circuits within the light detector array. The control circuit may be configured to change the status of the latch circuit on the basis of the number of pulses. In addition, the control circuit may be configured to set the latch circuit of the light receiving circuit where the counted number of pulses exceeds a threshold in a selected status (enabled) and set the latch circuit of the light receiving circuit where the counted number of pulses is equal to or smaller than the threshold in a non-selected status (disabled).

In addition, the light receiving device according to the present disclosure may further include a TDC. A plurality of the light receiving circuits may be connected to each other through a common lead and coupled to the TDC via a wired OR. In addition, a plurality of the light receiving circuits that are not adjacent to each other within the light detector array may be connected through a common lead. The above-described signal line PXOUT is an example of the lead.

The light receiving device according to the present disclosure may include a light detector array, a counter circuit, and a control circuit. The light detector array may include a plurality of pixels each configured to output a pulse in response to a reaction of a light detector with a photon. The counter circuit is configured to count a pulse outputted from at least one of the pixels of the light detector array. The control circuit is configured to select, from the light detector array, one of the pixels to be enabled and one of the pixels to be disabled, on the basis of the number of counts of pulses counted by the counter circuit.

In addition, the control circuit may be configured to enable, within the light detector array, one of the pixels where the number of counts of pulses exceeds a threshold and disable one of the pixels where the number of counts of pulses is equal to or smaller than the threshold.

In addition, the light receiving device according to the present disclosure may further include a TDC. A plurality of the pixels may be connected to each other through a common lead and coupled to the TDC via a wired OR. A plurality of the pixels that are not adjacent to each other within the light detector array may be connected through a common lead. The TDC may be coupled to a plurality of the pixels in an even-numbered column or ones of the pixels in an odd-numbered column. A plurality of leads may be coupled to the TDC via an OR gate.

In addition, the light receiving device according to the present disclosure may further include a oneshot circuit coupled at least either between the pixels or between an input terminal of the OR gate and the pixels. The oneshot circuit may include an AND gate and an inverter chain coupled to one of input terminals of the AND gate.

The light detector of the light detector array may include an avalanche photodiode. In addition, the avalanche photodiode may be configured to operate in the Geiger mode, and the pixels in the light detector array may each include a quenching circuit.

In performing ranging with a large field of view (FOV), an imaging performance in the vicinity of a periphery of the field of view deteriorates due to limitations on an optical system. This reduces the amount of light incident in the vicinity of a periphery of the light detector array as compared with in a central portion of the light detector array with a spot diameter of reflected light being increased. In a case where an effective pixel or an enabled pixel in the light detector array is fixed to a pixel at a predetermined position and region within the light detector array, a ranging performance, which includes a ranging accuracy and a maximum ranging distance, is reduced.

In the light receiving device according to the present disclosure, the light receiving circuits that can perform enabling/disabling provide the pixels in the light detector array. This makes it possible to set a macropixel by enabling one of the pixels in accordance with the position, shape, and size of a spotlight corresponding to an incident reflected light. This makes it possible to minimize an influence of a background light (a disturbance light) to increase a brightness dynamic range and a distance where ranging is possible. In other words, by virtue of using the light receiving device and the light receiving circuit according to the present disclosure, it is possible to perform a long-distance ranging with a large field of view (FOV).

In addition, in the light receiving device according to the present disclosure, a plurality of the pixels (the light receiving circuits) can share the TDC downstream thereof. For example, by virtue of the pixels not adjacent to each other and sharing the TDC downstream thereof, it is possible to reduce the necessary number of TDCs even though the number of pixels contained in a macropixel is increased. This makes it possible to maintain a ranging performance and reduce costs such as a circuit size.

The technology according to the present disclosure (the present technology) is applicable to a variety of products. For example, the technology according to the present disclosure may be implemented as a device to be mounted in any type of moving body among an automobile, an electric vehicle, a hybrid electric vehicle, a motorcycle, a bicycle, a personal mobility, an airplane, a drone, a ship, a robot, and the like.

Figure 28:
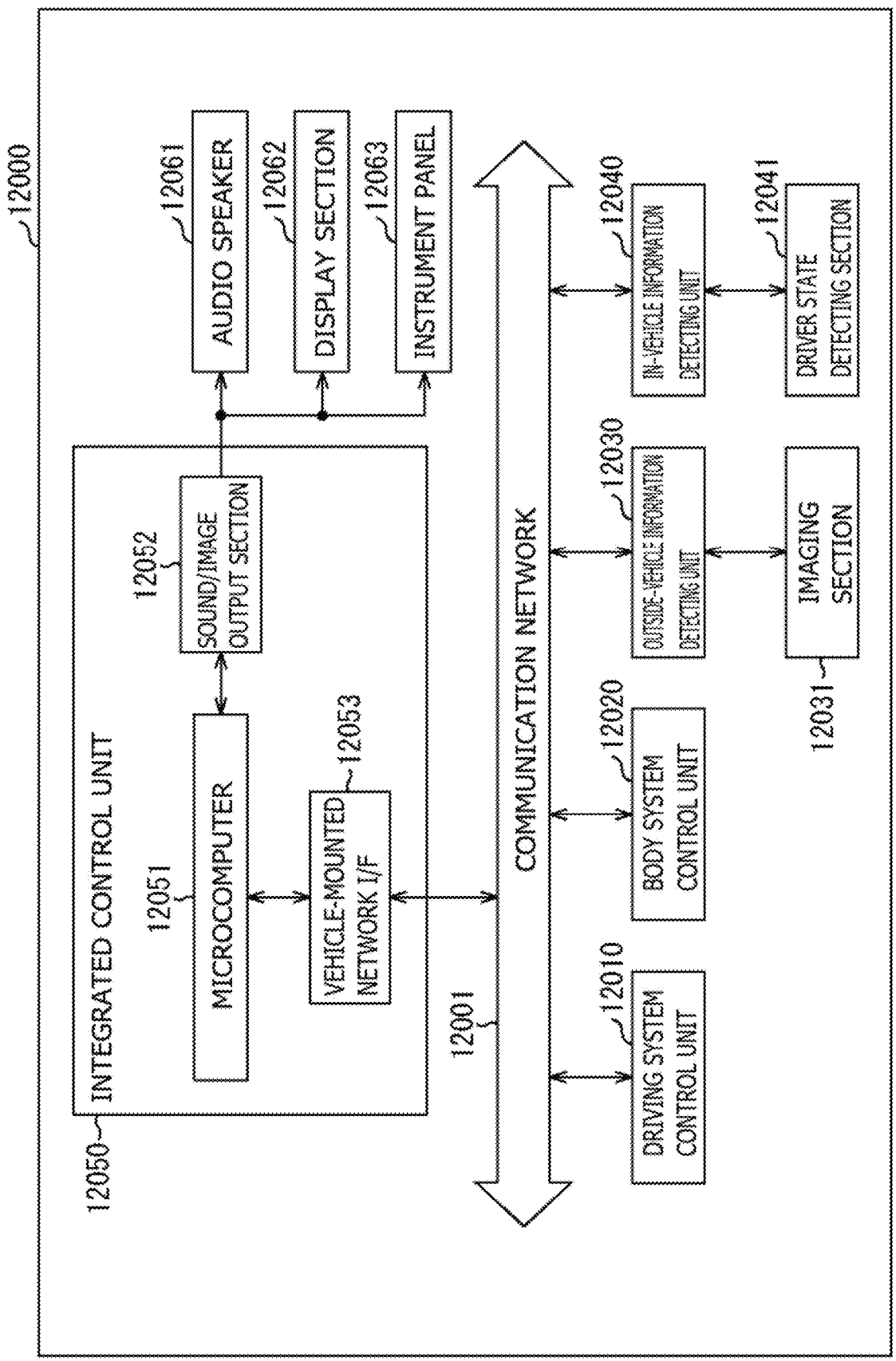

FIG. 28 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 28, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 28, an audio speaker 12061, a display section 12062, and an instrument panel 12063 are illustrated as the output device. The display section 12062 may, for example, include at least one of an on-board display and a head-up display.

Figure 29:
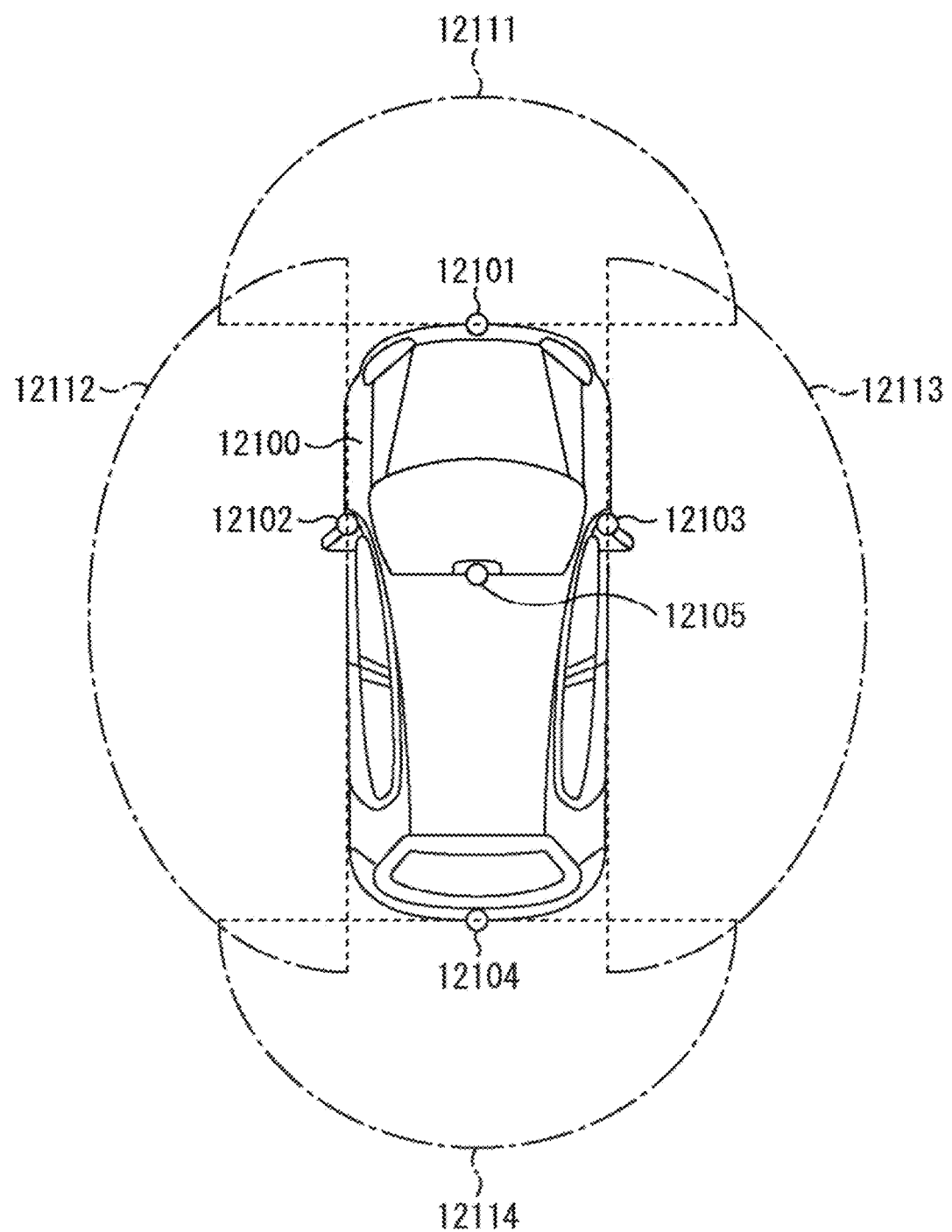

FIG. 29 is a diagram depicting an example of the installation position of the imaging section 12031.

In FIG. 29, the vehicle 12100 includes imaging sections 12101, 12102, 12103, 12104, and 12105 as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The image of the front obtained by the imaging sections 12101 and 12105 is used mainly to detect a preceding vehicle, a pedestrian, an obstacle, a signal, a traffic sign, a lane, or the like.

Incidentally, FIG. 29 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

Description is made hereinabove on an example of a vehicle control system to which the technology according to the present disclosure is applicable. The technology according to the present disclosure is applicable to, among the components explained above, for example, the imaging section 12031. Specifically, the imaging section 12031 can be equipped with the above-described light receiving circuit, light receiving device, or ranging device. By virtue of applying the technology according to the present disclosure to the imaging section 12031, accurate distance information can be obtained over a large FOV (field of view) and enhance the functionality and safety of the vehicle 12100.

It should be noted that the present technology can take the following configurations.

(1)
A light receiving device including:
a light detector array including a plurality of pixels each configured to output a pulse in response to a reaction of a light detector with a photon;

a counter circuit configured to count the pulse outputted from at least one of the pixels of the light detector array; and a control circuit configured to select, from the light detector array, one of the pixels to be enabled and one of the pixels to be disabled, on the basis of the number of counts of the pulse from the counter circuit.

(2)

The light receiving device according to (1), in which
the control circuit is configured to enable, within the light detector array, one of the pixels where the number of counts of the pulse exceeds a threshold and disable one of the pixels where the number of counts of the pulse is equal to or smaller than the threshold.

(3)

The light receiving device according to (1) or (2), further including:

a TDC, in which a plurality of the pixels are connected to each other through a common lead and coupled to the TDC via a wired OR.

(4)

The light receiving device according to (3), in which
a plurality of the pixels that are not adjacent to each other within the light detector array are connected through the common lead.

(5)

The light receiving device according to (3) or (4), in which the TDC is coupled to a plurality of the pixels in an even-numbered column or the pixels in an odd-numbered column.

(6)

The light receiving device according to any one of (3) to (5), in which a plurality of the leads are coupled to the TDC via an OR gate.

(7)

The light receiving device according to (6), further including:

a oneshot circuit coupled at least either between the pixels or between an input terminal of the OR gate and the pixels.

(8)

The light receiving device according to (7), in which
the oneshot circuit includes an AND gate and an inverter chain coupled to one of input terminals of the AND gate.

(9)

The light receiving device according to any one of (1) to (8), in which the light detector of the light detector array includes an avalanche photodiode.

(10)

The light receiving device according to (9), in which
the avalanche photodiode is configured to operate in a Geiger mode, and the pixels in the light detector array each include a quenching circuit.

(11)

A light receiving circuit including:

a light detector;

a load element coupled between the light detector and a first reference potential;

a latch circuit configured to output a first voltage corresponding to a status; and a first inverter configured to be turned on in response to a second voltage applied to a control terminal and to invert and output an output voltage of the light detector, in which the second voltage to be applied to the control terminal is variable according to the first voltage.

(12)

The light receiving circuit according to (11), further including:

an AND gate having a first input terminal coupled to an output side of the latch circuit, a second input terminal coupled to an enable line, and an output terminal coupled to the control terminal of the first inverter.

(13)

The light receiving circuit according to (11), further including:

a NAND gate having a first input terminal coupled to an output side of the latch circuit and a second input terminal coupled to an enable line; and a second inverter coupled between the NAND gate and the control terminal.

(14)

The light receiving circuit according to (11), further including:

a NAND gate having a first input terminal coupled to an output side of the latch circuit and a second input terminal coupled to an enable line;

a first transistor of a first conductivity type, the first transistor being coupled between the first reference potential and the load element and being turned on in response to an output voltage of the NAND gate;

a second transistor of a second conductivity type, the second transistor being coupled between an output side of the light detector and a second reference potential and being turned on in response to the output voltage of the NAND gate; and a second inverter coupled between an output terminal of the NAND gate and the control terminal of the first inverter.

(15)

The light receiving circuit according to any one of (11) to (14), in which the light detector includes an avalanche photodiode.

(16)

A light receiving device including:

a light detector array where a plurality of the light receiving circuits according to any one of (11) to (15) are arranged; and a control circuit configured to change the status of the latch circuit of at least one of the light receiving circuits within the light detector array.

(17)

The light receiving device according to (16), further including:

a counter circuit configured to count the number of pulses outputted from at least one of the light receiving circuits within the light detector array, in which the control circuit is configured to change the status of the latch circuit on the basis of the number of pulses.

(18)

The light receiving device according to (17), in which
the control circuit is configured to set the latch circuit of one of the light receiving circuits where the counted number of pulses exceeds a threshold in a selected status and set the latch circuit of one of the light receiving circuits where the counted number of pulses is equal to or smaller than the threshold in a non-selected status.

(19)

The light receiving device according to any one of (16) to (18), further including:
a TDC, in which
a plurality of the light receiving circuits are connected to each other through a common lead and coupled to the TDC via a wired OR.

(20)

The light receiving device according to (19), in which
a plurality of the light receiving circuits that are not adjacent to each other within the light detector array is connected through the common lead.

(21)

A ranging device including:
an array light source including a plurality of arrayed light emitting element;
a light detector array including a plurality of pixels each configured to output a pulse in response to a reaction of a light detector with a photon;
a control circuit configured to enable or disable an output of the pulse of at least one of the pixels of the light detector array; and
a counter circuit configured to count the pulse outputted from the at least one of the pixels of the light detector array, in which
the control circuit is configured to determine, in the light detector array, one of the pixels to be enabled and one of the pixels to be disabled, on the basis of the number of counts of the pulse from the counter circuit.

An aspect of the present disclosure is not limited to the above-described individual embodiments; it includes various modifications conceivable to those skilled in the art and the effects of the present disclosure are not limited to the above-described contents. In other words, various additions, changes, and partial deletions are acceptable without departing from the conceptual idea and scope of the present disclosure derived from the contents defined in the claims and their equivalents.

REFERENCE SIGNS LIST

PD: Photodiode
1: Ranging device
2: Light source device
3: Collimator lens
4: Condenser lens
5: Bandpass filter
10, 10A: Light receiving device
11: SPAD array (light detector array)
11P: Pixel
12: Readout circuit
13A: TDC
16: Control circuit
20, 20A: Light receiving circuit
21: Latch circuit
22: NAND gate
23, 24: Inverter
30: Counter circuit
31: Storage section

The invention claimed is:

1. A light receiving device, comprising:
a light detector array including a plurality of pixels, wherein each of the plurality of pixels is configured to output a pulse in response to a reaction of a light detector with a photon;
a counter circuit configured to count the pulse outputted from at least one of the plurality of pixels of the light detector array;
a control circuit configured to select, from the light detector array, one of the plurality of pixels to be enabled and one of the plurality of pixels to be disabled, based on a number of counts of the pulse from the counter circuit; and
a TDC (Time to Digital Converter), wherein the plurality of pixels, that are non-adjacent within the light detector array, are connected through a common lead and coupled to the TDC via a wired OR.

2. The light receiving device according to claim 1, wherein the control circuit is further configured to:
enable, within the light detector array, one of the plurality of pixels where the number of counts of the pulse exceeds a threshold, and
disable one of the plurality of pixels where the number of counts of the pulse is equal to or smaller than the threshold.

3. The light receiving device according to claim 1, wherein the TDC is coupled to the plurality of the pixels in an even-numbered column or in an odd-numbered column.

4. The light receiving device according to claim 1, wherein a plurality of leads are coupled to the TDC via an OR gate, wherein the plurality of leads include the common lead.

5. The light receiving device according to claim 4, further comprising:
a oneshot circuit coupled at least either between the plurality of pixels or between an input terminal of the OR gate and the plurality of pixels.

6. The light receiving device according to claim 5, wherein the oneshot circuit includes an AND gate and an inverter chain coupled to one of input terminals of the AND gate.

7. The light receiving device according to claim 1, wherein the light detector of the light detector array includes an avalanche photodiode.

8. The light receiving device according to claim 7, wherein the avalanche photodiode is configured to operate in a Geiger mode, and each of the plurality of pixels in the light detector array includes a quenching circuit.

* * * * *